(12) United States Patent  (10) Patent No.: US 7,408,548 B2
Guenter et al.  (45) Date of Patent: Aug. 5, 2008

(54) TRIANGULATING PROCEDURAL GEOMETRIC OBJECTS

(75) Inventors: Brian K. Guenter, Redmond, WA (US); Marcel Gavriliu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

(21) Appl. No.: 11/172,653

(22) Filed: Jun. 30, 2005

(65) Prior Publication Data
US 2007/0002043 A1  Jan. 4, 2007

(51) Int. Cl.
*G06T 17/00* (2006.01)
(52) U.S. Cl. ........................ 345/420; 345/419; 345/421; 345/423; 345/581; 345/583; 700/66; 700/90; 700/186
(58) Field of Classification Search ................. 345/419, 345/420, 421, 423, 581, 583
See application file for complete search history.

(56) References Cited

U.S. PATENT DOCUMENTS

| | | | | |
|---|---|---|---|---|
| 6,100,893 | A | * | 8/2000 | Ensz et al. .................. 345/420 |
| 6,285,372 | B1 | * | 9/2001 | Cowsar et al. .............. 345/420 |
| 6,300,958 | B1 | | 10/2001 | Mallet |
| 6,356,263 | B2 | * | 3/2002 | Migdal et al. ............... 345/423 |
| 6,525,727 | B1 | | 2/2003 | Junkins et al. |
| 6,806,875 | B2 | | 10/2004 | Nakatsuka et al. |
| 2002/0171643 | A1 | | 11/2002 | Ernst et al. |
| 2003/0174133 | A1 | | 9/2003 | Shehane et al. |
| 2004/0114794 | A1 | | 6/2004 | Vlasic et al. |
| 2004/0263516 | A1 | | 12/2004 | Michaili et al. |

FOREIGN PATENT DOCUMENTS

KR  2005-0044964 A  5/2005

WO  WO 2004-044689 A2  5/2004

OTHER PUBLICATIONS

International Search Report and Written Opinion for PCT/US06/25413 dated Feb. 15, 2007, 5 pages.
International Search Report from PCT/US2006/032227 dated Dec. 28, 2006, 3 pages.
Bühler, "Implicit Linear Interval Estimations," *Proceedings of the 18th Spring Conference On Computer Graphics*, Apr. 24-27, 2002, Budumerice, Slovakia.

(Continued)

*Primary Examiner*—Kimbinh T Nguyen
(74) *Attorney, Agent, or Firm*—Klarquist Sparkman, LLP

(57)  ABSTRACT

A complex procedural surface can be expressed based on some constructive solid geometry operations performed on primitive procedural surfaces. The domain based representation of the complex procedural surface includes implicit curves of intersection. During pre-processing, the parts of the domain based representation to be triangulated are first subdivided into simple triangles not bound on any side by an edge related to the parameterized regions of the implicit curve and curve visibility triangles. The coarse pre-processed triangulated mesh is later refined during runtime by further subdividing the coarse mesh to add triangles with curve based edges and non-curve based edges to generate a mesh of sampling triangles. The more refined sampling triangle mesh is further refined by applying geometry instancing to map appropriate instance meshes into the appropriate sampling triangles to create an even more refined triangulated mesh at runtime for rendering.

20 Claims, 20 Drawing Sheets

OTHER PUBLICATIONS

Duff, "Interval Arithmetic and Recursive Subdivision for Implict Functions and Constructive Solid Geometry," *ACM Siggraph Computer Graphics, Proceedings of the 19th Annual Conference on Computer Graphics and Interactive Techniques*, vol. 26, Issue 2, pp. 131-138, Jul. 1992.

Krishnan et al., "An Efficient Surface Intersection Algorithm Based on Lower-Dimensional Formulation," *ACM Transactions On Graphics (TOG)*, vol. 16, Issue 1, Jan. 1997, pp. 74-106.

Ponamgi et al., "Incremental Algorithms for Collision Detection Between Solid Models," *Proceedings of The Third ACM Symposium On Solid Modeling and Applications*, pp. 293-304, May 17-19, 1995, Salt Lake City, Utah, United States.

Snyder et al., "Generative Modeling: A Symbolic System for Geometric Modeling," California Institute of Technology, from *Proceedings of SIGGRAPH 1992*, Association for Computing Machinery Special Interest Group on Computer Graphics (ACM SIGGRAPH), vol. 26, Issue 2, Jul. 1992, pp. 369-378.

Snyder et al., "Interval Methods For Multi-Point Collisions Between Time-Dependent Curved Surfaces," *Proceedings Of The 20th Annual Conference On Computer Graphics and Interactive Techniques*, pp. 321-334, Sep. 1993, 11 pages.

Synder, "Interval Analysis for Computer Graphics," *ACM SIGGRAPH Computer Graphics, Proceedings of the 19th Annual Conference on Computer Graphics and Interactive Techniques*, vol. 26, Issue 2, Jul. 1992.

Argyros, "On the comparison of a weak variant of the Newton-Kantorovich and Miranda theorems," *Journal of Computational and Applied Mathematics*, vol. 166, Issue 2, Apr. 2004, pp. 585-589, available online as of Feb. 20, 2004.

Argyros, "On the Newton-Kantorovich hypothesis for solving equations," *Journal of Computational and Applied Mathematics*, vol. 169, Issue 2, Aug. 2004, pp. 315-332, available online as of Mar. 19, 2004.

Dennis, "On the Kantorovich Hypothesis for Newton's Method," *SIAM J. Numer. Anal.*, vol. 6, No. 3, Sep. 1969, pp. 493-507.

Gottschalk et al., "OBBTree: A Hierarchial Structure For Rapid Interference Detection," *Proceedings Of The 23rd Annual Conference on Computer Graphics and Interactive Techniques*, 1996, pp. 171-180.

Gutierrez et al., "Newton's method under weak Kantorovich conditions," *IMA Journal of Numerical Analysis*, vol. 20, 2000, pp. 521-532.

Hernandez, "A modification of the classical Kantorovich conditions for Newton's method," *Journal of Computational and Applied Mathematics*, vol. 137, 2001, pp. 201-205.

Kramer, "The Iterative Determination of Model Parameters by Newton's Method," *General Electric Company*, Sep. 1967, 20 pages.

Matthews, "Module for Fixed Point Iteration and Newton's Method in 2D and 3D," http://math.fullerton.edu/mathews/n2003/FixPointNewtonMod.html, Mar. 14, 2004, 9 pages.

Nataraj et al., "A New Super-Convergent Inclusion Function Form and its Use in Global Optimization," *SIAM Workshop on Validated Computing*, May 2002, pp. 1-9.

Wiethoff, "Interval Newton Method," http://rz.uni-karlsruhe.de/~iam/html/language/cxsc/node12.html, Mar. 29, 1995, 2 pages.

Wikipedia, "Invertible Matrix," http://en.wikipedia.org/wiki/Singular_matrix, Jul. 31, 2004, 7 pages.

Zlepko et al., "An Application of a Modification of the Newton-Kantorovich Method to the Approximate Construction of Implicit Functions," Ukrainskii Matematicheskii Zhurnal, vol. 30, No. 2, Mar.-Apr. 1978, 4 pages.

Bartels et al., "An introduction to splines for use in computer graphics & geometric modeling," Chapter 3, Hermite and Cubic Spline Interpolation, San Francisco, CA, Morgan Kaufmann, pp. 9-17, 1998.

Sederberg et al., "Geometric hermite approximation of surface patch intersection curves," Computer Aided Geometric Design 8:97-114, 1991.

* cited by examiner

FIG. 21

```
            Struct VS_IN{        2115
                    float3 bary,
    2120       ┌──► float2 p0,
         ╲    │    float2 p1,
              └──► float2 p2};
            Main( VS_IN In ){
                float2 pos = In.bary.x*In.p0  ◄─┐
                           + In.bary.y*In.p1    ├── 2130
                           +In.bary.z*In.p2;  ◄─┘
            }
```

2100

Software 2280 Implementing Triangulating Procedural Geometric Objects

TRIANGULATING PROCEDURAL GEOMETRIC OBJECTS

TECHNICAL FIELD

The technical field relates to computer graphics. More particularly, the field relates to rendering computer generated images on a computer display device.

BACKGROUND

Constructive Solid Geometry (CSG) is a method of modeling graphical surfaces whereby more complex surfaces are modeled as a combination of simpler surfaces. For instance, in computer graphics, CSG provides a powerful way for defining surfaces of higher genus (e.g. a sphere with a hole) from surfaces of lower genus, such as a plain cylinder and plain sphere. CSG components including primitives such as cylinders and spheres can be described in terms of a procedure or a function that accepts some number of parameters. For instance, a spherical three-dimensional (3D) surface can be defined procedurally in terms of coordinates of its center and a value of its radius. More complex objects can then be modeled through CSG operations performed using such procedural objects.

Procedural models for 3D surfaces have many desirable characteristics. For instance, they are more compact than polygon meshes or polynomial surface patches (e.g., splines), they are resolution independent and they can be modified at runtime by changing a small number of parameters. Compactness is important for many reasons. For instance, storing a compact representation costs less in terms of memory. Also, a compact representation can be rendered much faster than a larger one, even if much more computation is required to process the compact representation at runtime.

In one method of rendering such procedural surfaces for display, the procedural surface representation is transformed into a mesh of interconnected triangles. This step of computer graphics processing is generally referred to as triangulation or tessellation, for instance. Triangles are preferred because of their simplistic representation and their suitability for rendering. However, triangulating procedural surfaces and storing the data structures describing the triangulated surface model also consumes memory and can be costly for that reason. As a result, it is desirable to perform more tasks related to triangulation at runtime just prior to rendering to a display and thus, avoid costs associated with storing and retrieving data related to triangulated representations of procedural surfaces.

SUMMARY

Described herein are methods and systems for rendering complex procedural surfaces formed at least in part by performing CSG operations using data representing primitive procedural surfaces. The CSG operations produce implicit curves of intersection defined by implicit functions. Implicit functions comprise a plurality of domain variables and the implicit curves of intersection are divided into a plurality of parameterization regions. In a further aspect, the domain based representation of the complex procedural surface is pre-processed statically to generate a coarsely triangulated mesh in the domain. The coarsely triangulated mesh is stored in memory and at runtime refined further by further subdivisions and by applying geometry instancing.

In yet another aspect, the coarse triangulated mesh is generated at least in part by adding constraining edges connecting end points as well as some intermediate points of parameterization regions of the implicit curves of intersection produced by the CSG operations. In another aspect, Delaunay triangulation methods are applied to minimize the occurrence of thin sliver triangles in the coarsely triangulated mesh of the domain. The triangulated mesh with Delaunay triangulation is further enhanced by generating curve visibility triangles.

In one aspect, the curve visibility triangles comprise apexes such that line segments drawn from the apex to the corresponding constraining edges intersects the corresponding implicit curve of intersection in no more than one place. In one further aspect, the statically generated coarsely triangulated mesh is generated by the central processing unit (CPU) of a general purpose computer system and stored for later use.

In yet another aspect, the statically generated coarsely triangulated mesh is further sub-divided at runtime to generate a more refined sampling triangle mesh at least by adding edges related to curve points intermediate to the end points of the parameterization regions and sub-dividing non-curve based simple triangles of the coarse mesh to match a user defined parametric length constraint.

In one more aspect, the sampling triangle mesh is further refined by applying geometry instancing. One method of applying geometry instancing comprises selecting the appropriate instance mesh based at least in part on a classification of the sampling triangle type and mapping the instance mesh within the sampling triangle. In one more aspect, applying geometry instancing is implemented on a graphics processing unit (GPU) at runtime. In a further aspect, the vertex data of the triangles of the sampling triangle mesh is received by the GPU along with data classifying the sampling triangles into various types. Based at least in part on the classification data of the sampling triangles, the appropriate instance mesh is selected to be mapped within the sampling triangles. In one method of mapping, identically classified sampling triangles from a mesh are grouped and mapped using the appropriate instance mesh together. In one aspect, the mapping is accomplished by using barycentric coordinates of the instance mesh with respect to the vertex data of the triangles of the sampling triangle mesh.

Listed above are at least some features of at least some of the embodiments. Additional features and advantages will become apparent from the following detailed description of illustrated embodiments, which proceeds with reference to accompanying drawings.

BRIEF DESCRIPTION OF THE FIGURES

FIG. 21 is a listing describing an exemplary method for mapping the appropriately selected geometry instance meshes within the appropriate sampling triangle type.

DETAILED DESCRIPTION

Exemplary CSG Operations

Figure 1A:
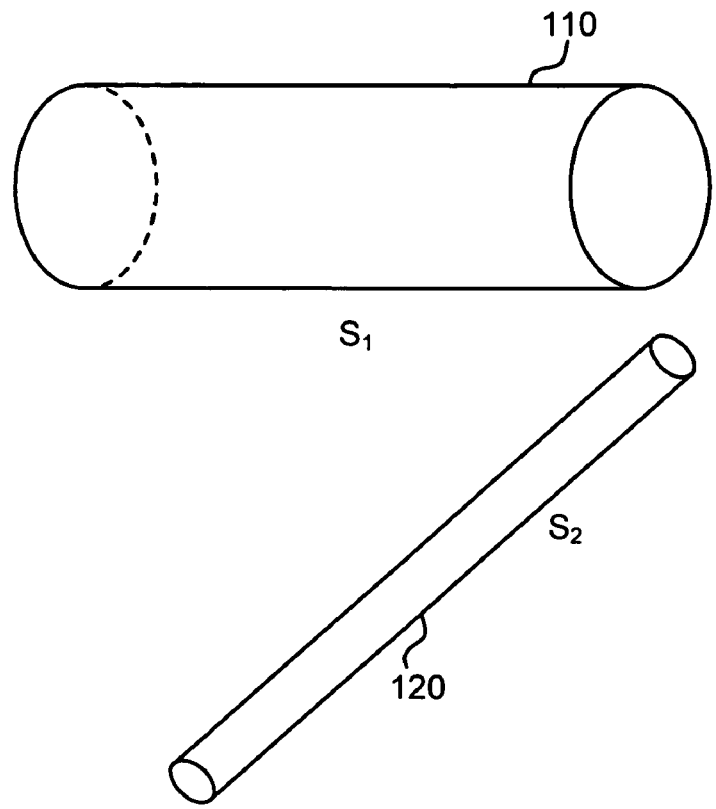
FIG. 1A is a block diagram illustrating two exemplary procedural surface primitives.
Figure 1B:
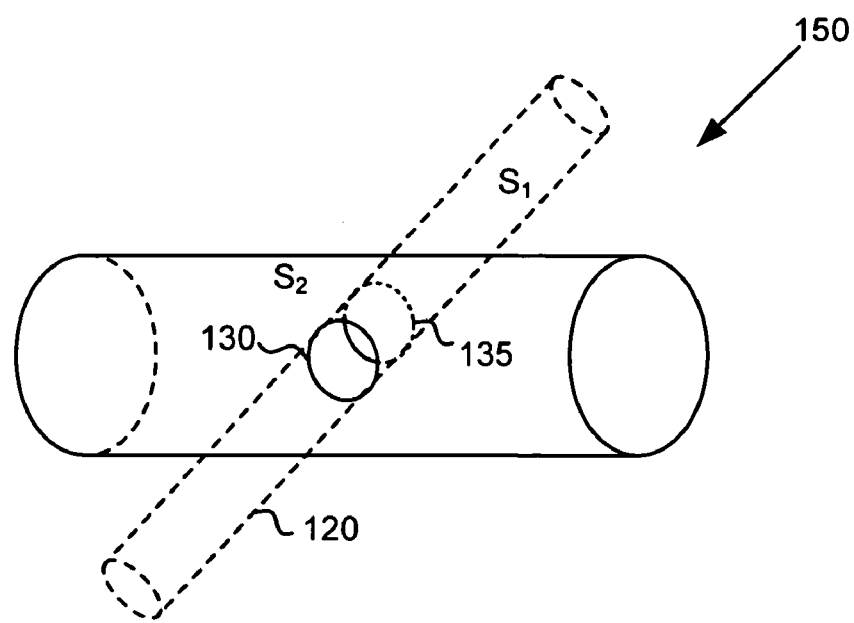
FIG. 1B is a block diagram illustrating an exemplary complex procedural surface generated by performing an exemplary constructive solid geometry operation on the primitive surfaces illustrated in FIG. 1A.

FIG. 1A illustrates exemplary procedural surfaces $S_1$ 110 and $S_2$ 120 which are both cylindrical surfaces that can be described in terms of a procedure of some functions $f_1(u_1, v_1)$ and $f_2(u_2, v_2)$, respectively in a two dimensional domain plane, for instance. FIG. 1B illustrates the result of a CSG operation involving surfaces $S_1$ 110 and $S_2$ 120. In particular, FIG. 1B illustrates the result of a Boolean difference attained by subtracting the smaller surface $S_2$ 120 from the larger surface $S_1$ 110. The illustrated operation and surfaces are exemplary. Other operations such as intersections and unions of various surfaces such as spheres, surfaces of revolution, or polynomial patches are also possible.

The 3D surfaces $S_1$ 110 and $S_2$ 120 described as $f_1(u_1, v_1)$ and $f_2(u_2, v_2)$ may be defined as follows:

$$f_1(u_1,v_1)=[f_{1x}(u_1,v_1), f_{1y}(u_1,v_1), f_{1z}(u_1,v_1)]^T$$

$$f_2(u_2,v_2)=[f_{2x}(u_2,v_2), f_{2y}(u_2,v), f_{2z}(u_2,v_2)]^T$$

Furthermore, the curves of intersection of surfaces $S_1$ 110 and $S_2$ 120, (e.g., at 130 and 135 in FIG. 1B) are defined implicitly as some function $F=f_1(u_1,v_1)-f_2(u_2,v_2)=[0_x,0_y,0_z]$. Since the primitives $S_1$ 110 and $S_2$ 120 are described procedurally by a function in terms of domain variables $(u_1, v_1)$ and $(u_2, v_2)$ then the function F describing the implicit curves of intersection is a function of four domain variables $F(u_1, v_1, u_2, v_2)$.

Exemplary Rendering of Procedural Surfaces

Figure 2:
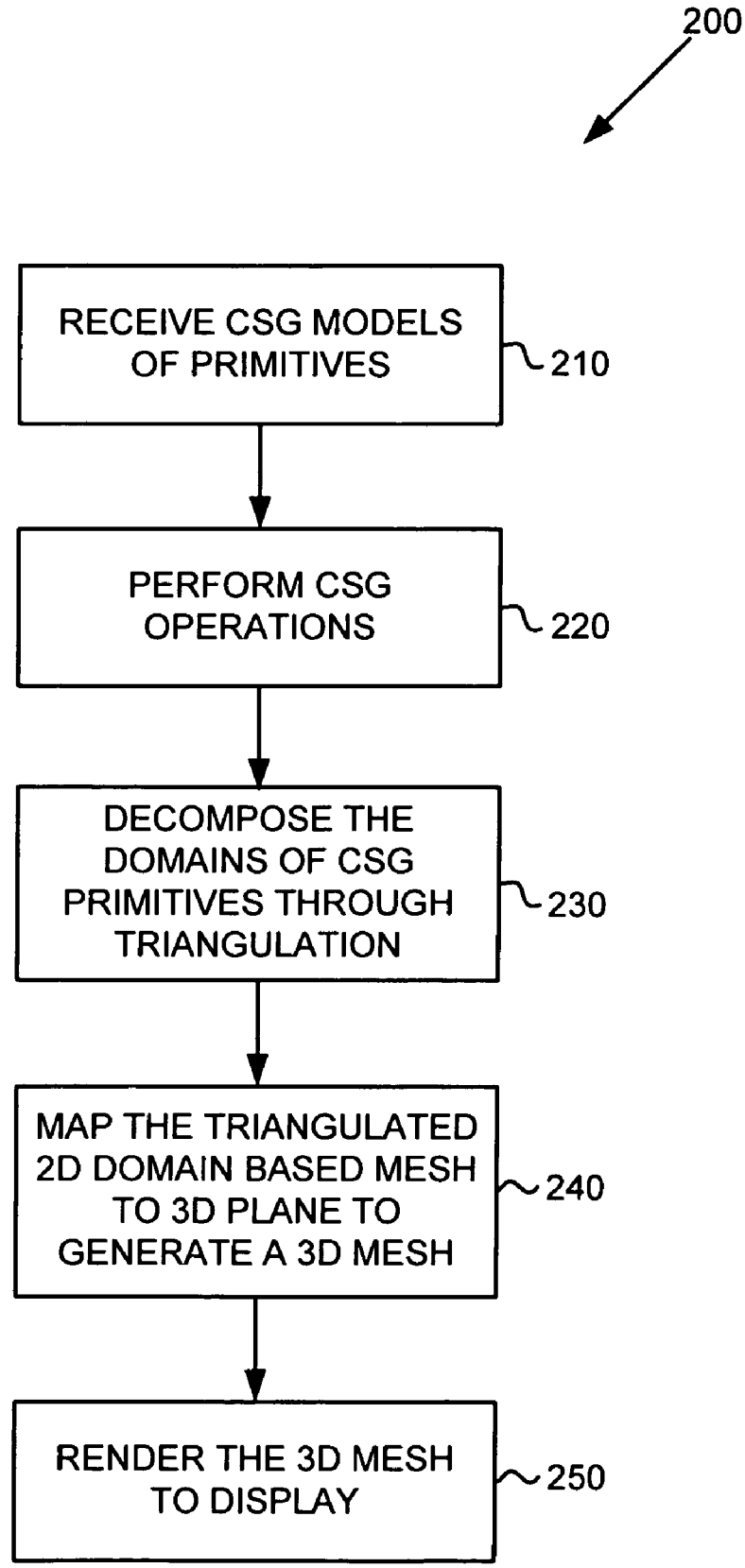
FIG. 2 is a flow diagram describing an overall method for rendering complex procedural surfaces through triangulation.

Complex procedural surfaces generated by performing CSG operations may be selected to be displayed on a screen. Applying triangulation to representations of such complex procedural surfaces is one way to render the surfaces on the screen or the display. FIG. 2 provides an overall method 200 for rendering complex procedural surfaces such as 150 in FIG. 1B, including any implicit curves of intersection. First at 210, a computer graphics processing system (e.g., 400 in FIG. 4) receives models of primitives (e.g., 110 and 120 in FIG. 1A) and at 220 CSG operations (e.g., as illustrated in FIG. 1B) are performed to generate a complex procedural surface such as 150 in FIG. 1B. Then at 230, the 2D domain based representations of the CSG procedural surfaces (e.g., 500 and 550 in FIG. 5) that implicitly account for the performed CSG operation are decomposed into a mesh of triangles through a chosen process of triangulation.

The 2D meshes are in the domains of the surfaces. There is a 2D mesh for every surface that contributes to a complex CSG procedural surface. If there is one CSG operation between 2 procedural surfaces then there will be 2 meshes to be decomposed. If there are 2 CSG operations between 3 meshes then there will be 3 meshes to be decomposed and so on.

At 240, the 3D mesh of the final complex procedural surface is made from components of the domain based 2D meshes (e.g., 500 and 550) of the primitive procedural surfaces by mapping from the 2D plane to a 3D plane. The mapping is done on the GPU (e.g., 430 in FIG. 4), for instance, by a vertex shader program using the expression or procedure for the appropriate surface. At 250 this 3D mesh is rendered to produce an image on a display.

Figure 3:
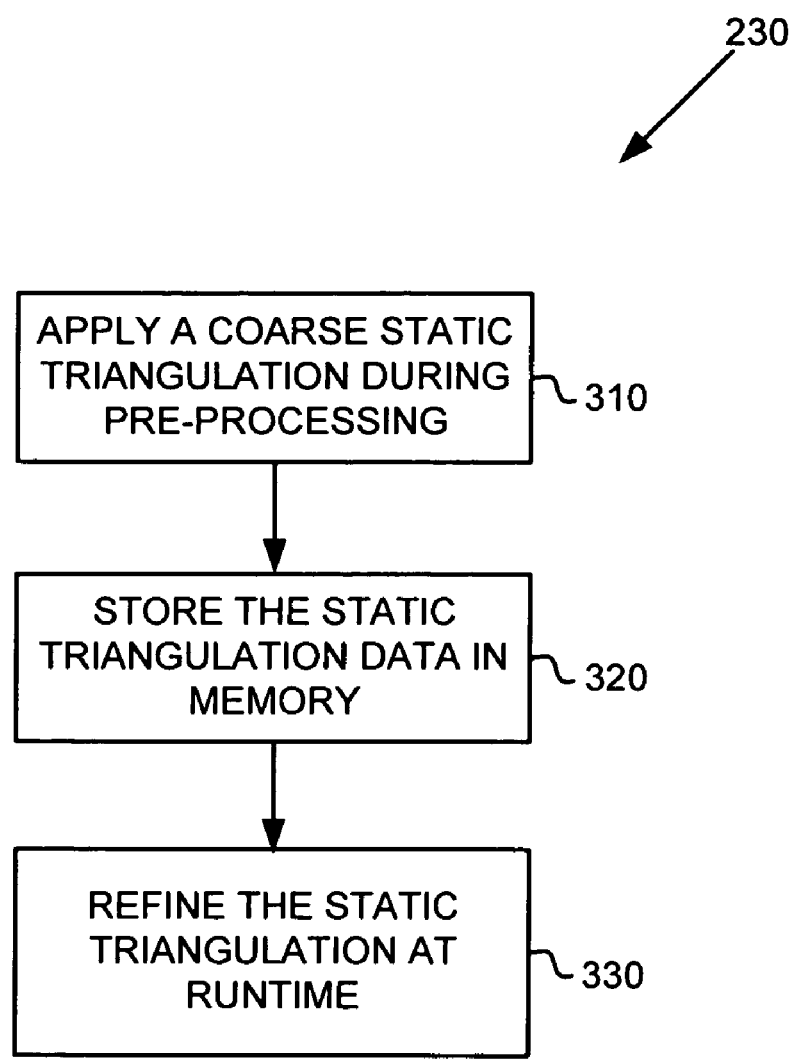
FIG. 3 is a flow diagram of an overall method for generating a triangulated mesh for representing procedural surfaces.

FIG. 3 illustrates an exemplary method 230 for applying triangulation to domain based representations related to the CSG procedural surfaces. At 310, the domain based representations related to the CSG procedural surfaces are decomposed statically into a coarse mesh of triangles during pre-processing. Later at 320, the static triangulation data is stored in memory. At 330, the static triangulation is refined further at runtime to generate a finer mesh of triangulation to represent the complexity of the surface in additional detail. The additional processing at runtime to attain the final triangulation before rendering has the advantage of reducing the cost of resources needed to store and retrieve data structures related to the complex triangular meshes of the CSG procedural surfaces to be displayed. This also results in additional flexibility such as, for instance, triangulating only those portions of CSG procedural surfaces that are to be displayed after the CSG operations.

Exemplary Graphics Processing System for Rendering of Procedural Surfaces

Figure 4:
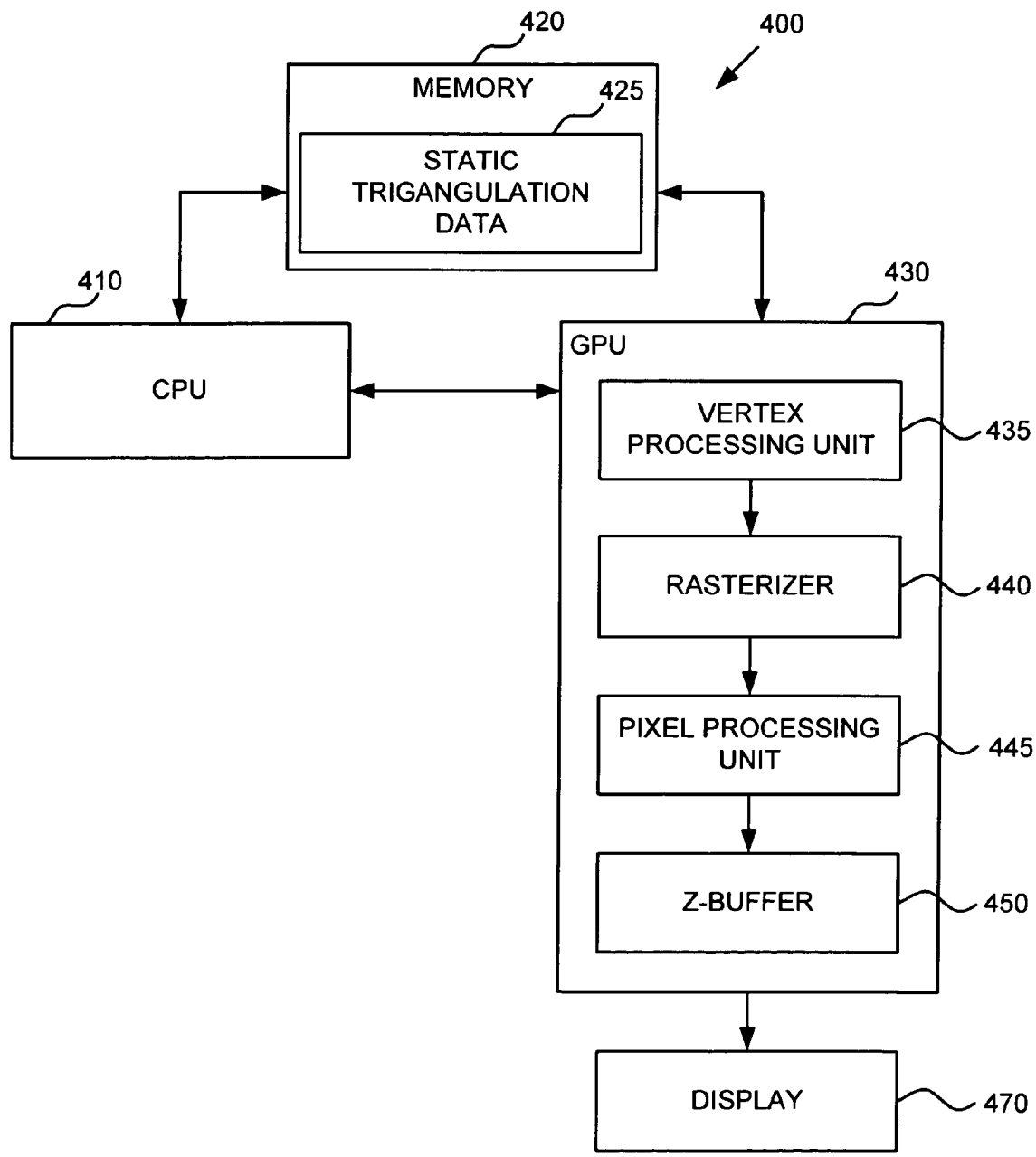
FIG. 4 is a block diagram illustrating at least some components of an exemplary graphics processing system for rendering graphical objects including procedural surfaces based on a triangulated mesh representing the surfaces to be rendered.

FIG. 4 illustrates an exemplary graphics processing system 400 comprising components for processing data related to computer generated graphics in a manner suitable for displaying the graphics to a user. The system comprises a programmable general purpose Central Processing Unit (CPU) 410. A memory 420 that is accessible to the CPU 410 and the Graphical Processing Unit (GPU) at 430. In one embodiment, the step 310 of statically decomposing the domains of CSG procedural surfaces by a coarse triangulation is desirably accomplished in the CPU 410 during pre-processing and stored in memory 420 as static triangulation data 425. The GPU 430 can receive the static triangulation data 425 for further processing before rendering the CSG procedural surfaces on the display 470.

The exemplary GPU 430 comprises a vertex processing unit 435 (VPU) for processing vertex data of a triangulated mesh derived from the static triangulation data 425. The processing may include further transformation of the CSG procedural surfaces. For instance, the VPU 435 typically applies vertex shader programs to dynamically construct the 3D meshes of the CSG surfaces from the coarse domain triangulation, as well as the usual 3D transformations. The Rasterizer 440 receives the vertex data in form of a series of vectors and transforms them into pixel data corresponding to pixels for display. The pixel processing unit 445 can then produce the final color (e.g., via adjusting lighting and shading) for pixels of the display 470. The Z-buffer 450 typically adds depth data so that, in the display 470, elements of a rendered scene are displayed to a user relative in depth to each other. The system 400 and components thereof are merely illustrative. Other components may be added and some of the illustrated components may be removed.

Exemplary Parameterization of Implicit Curves of Intersection

Figure 5:
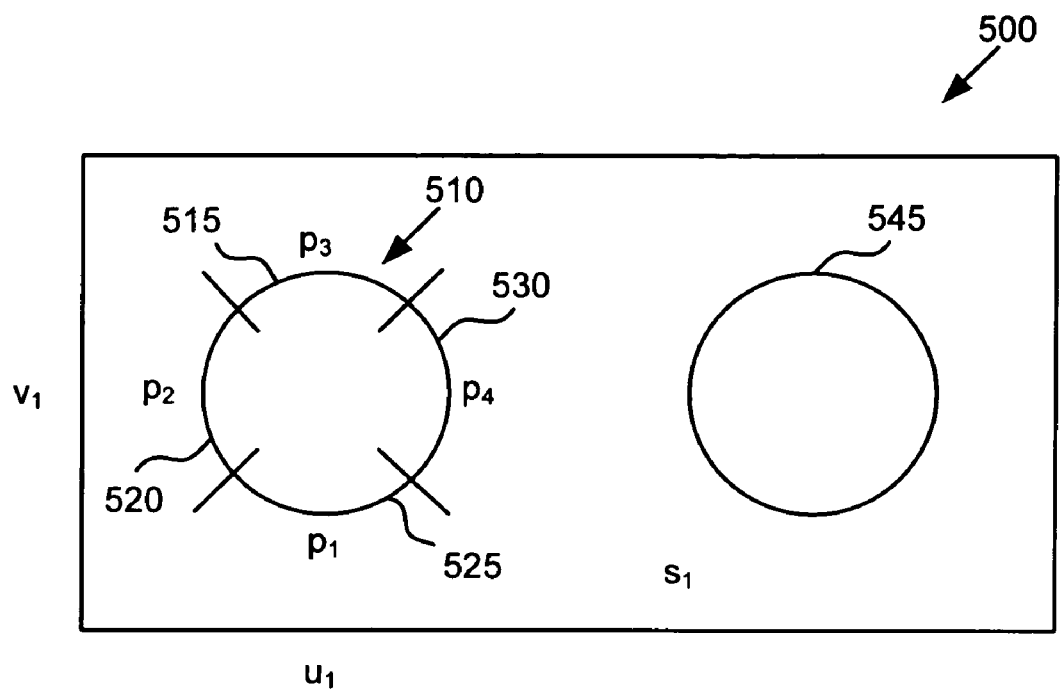
FIG. 5 is a block diagram illustrating an exemplary domain based representation of the exemplary surfaces including implicit curves of intersection where a plurality of surfaces intersect each other.
Figure 5:
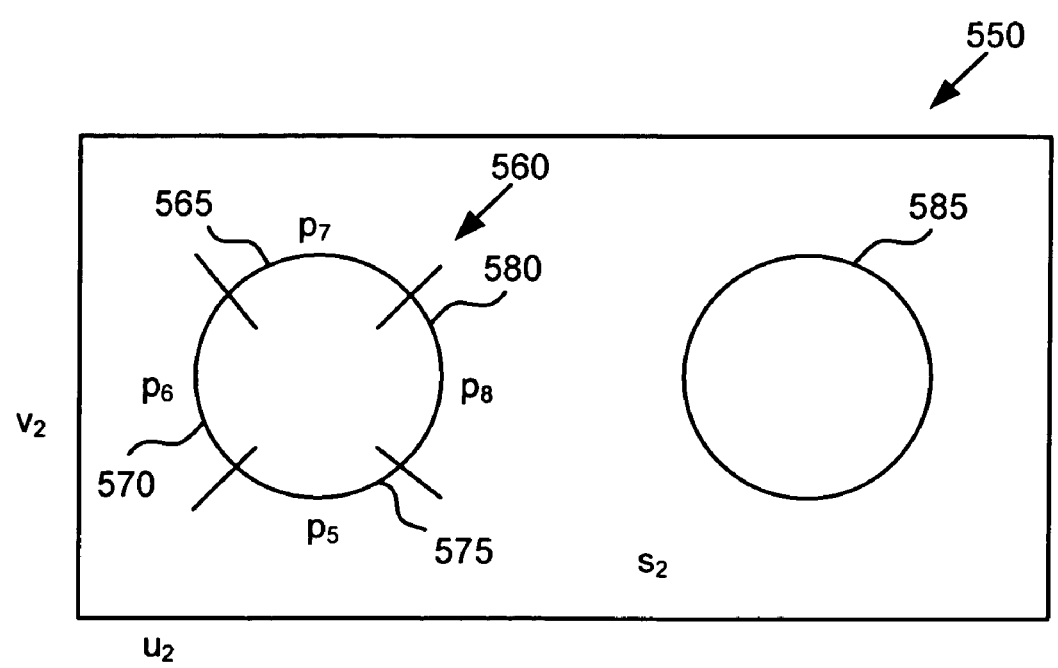

The domains based representations of the exemplary surfaces $S_1$ 110 and $S_2$ 120 are shown in FIG. 5 at 500 and 550 respectively. The curves 510, 545, 560 and 585 represent points in each of the two domains where the two surfaces $S_1$ 110 and $S_2$ 120 intersect (e.g., 130 and 135 in FIG. 1). The rest of the point values of $(u_1, v_1)$ and $(u_2, v_2)$ of the respective domains 500 and 550 represent the rest of the points of the respective surfaces $S_1$ 110 and $S_2$ 120. The domains 500 and 550 can together represent a domain based representation of any complex procedural surface formed by applying CSG operations to the primitives $S_1$ 110 and $S_2$ 120.

The step 230 (FIG. 2) of decomposition of the domain based representations 500 and 550 begins with determining parameterization regions of the curves of intersection 510, 545, 560 and 585, respectively. Given the procedural function $F(u_1, v_1, u_2, v_2)$ as described above where $F(x)=F(u_1, v_1, u_2, v_2)$ is such that $(\bar{x})$ is a range of values of the 4D domain variables $(u_1, v_1, u_2, v_2)$ and suppose there is a function $FP(x_p)=x_d$ such that $x_p$ and $x_d$ partition the vector of variables x into a vector of parameterizing variables (also known as independent variables) and a vector of dependent variables, respectively. If the $F(x)$ is such that $F:R^m \to R^n$, then the number m−n denotes the number of parameterizing variables in a transformation. Thus, the function $FP(x_p)$ allows for the dependent variables $x_d$ to be expressed in terms of the independent or parameterizing variables $x_p$. Thus, the ability to parameterize an implicit function has the immediate advantage of reducing the memory needed to store a representation of such a function since values of dependent variables can be derived from the values of the independent or parameterizing variables. The actual number of m variables compared to n variables in a function $F:R^m \to R^n$ can vary. For instance, a $4 \to 3$ transformation is one typical transformation in CSG.

Exemplary Methods for Determining Parameterization

It may not be always possible to parameterize an implicit function such as the one describing the curves of intersection (e.g., 510 and 560). More particularly, not every variable of an implicit function can be used in an expression as a parameterizing variable to express other variables of the function. One way to prove the possibility of a parameterization by any of the domain variables of an implicit function is to apply a simple form of the implicit function theorem to determine which of the various dependent derivative matrices of such a function approach non-singularity. For instance, in the example above, wherein F is such that $F:R^4 \to R^3$ with 4 domain variables and 3 range variables and $F(u_1, v_1, u_2, v_2)=F(f_x, f_y, f_z)$ will yield a derivative matrix as follows:

$$\begin{matrix} \frac{\partial f_x}{\partial u_1} & \frac{\partial f_x}{\partial v_1} & \frac{\partial f_x}{\partial u_2} & \frac{\partial f_x}{\partial v_2} \\ \frac{\partial f_y}{\partial u_1} & \frac{\partial f_y}{\partial v_1} & \frac{\partial f_y}{\partial u_2} & \frac{\partial f_y}{\partial v_2} \\ \frac{\partial f_z}{\partial u_1} & \frac{\partial f_z}{\partial v_1} & \frac{\partial f_z}{\partial u_2} & \frac{\partial f_z}{\partial v_2} \end{matrix}$$

Suppose a dependent derivative matrix with $u_1$ as the independent variable is as follows:

$$\begin{matrix} \frac{\partial f_x}{\partial v_1} & \frac{\partial f_x}{\partial u_2} & \frac{\partial f_x}{\partial v_2} \\ \frac{\partial f_y}{\partial v_1} & \frac{\partial f_y}{\partial u_2} & \frac{\partial f_y}{\partial v_2} \\ \frac{\partial f_z}{\partial v_1} & \frac{\partial f_z}{\partial u_2} & \frac{\partial f_z}{\partial v_2} \end{matrix}$$

According to a simple form of the implicit function theorem, if the above dependent derivative matrix is non-singular such that no one column of the matrix can be expressed as a weighted sum of the others then the implicit function can be expressed in a parametric form with $u_1$ in this instance as the parameterizing or independent variable. Dependent derivative matrices based on the other variables may also be non-singular and thus indicate the possibility of parameterization of the function based on these other variables such that these variables may also serve as parameterizing variables.

However, in different parts of the curve (e.g., 510 and 560) there are advantages in selecting one variable as the parameterizing variable over the others to parameterize different parts of a curve. As shown in FIG. 5, for instance, within a 2D domain such as ($u_1$, $v_1$) parameterization regions can be selected based on non-singularity property of the relevant dependent derivative matrices. In FIG. 5, at 515 ($P_3$), $u_1$ as the parameterizing variable, whereas at 520 ($P_2$) $v_1$ is a better choice. This is at least partially dependent on the fact that within the region 515 ($P_3$) every value of parameterizing variable $u_1$ is guaranteed to have just one corresponding value of the dependent variable $v_1$. Looking at the entire curve of intersection 510 however no one parameterizing variable $u_1$ or $v_1$ is guaranteed to have each of their values on the curve correspond to a single value of the other variable. As a result, the curve 510 is divided into exemplary parameterization regions $P_1$ 525, $P_2$ 520, $P_3$ 515 and $P_4$ 530. In regions $P_1$ 525 and $P_3$ 515, the parameterizing variable is $u_1$, whereas in regions $P_2$ 520 and $P_4$ 530 the parameterizing variable is $v_1$. Similar divisions (e.g., 565, 570, 575 and 580) of the exemplary intersection curve 560 in the domain 550 of the surface $S_2$ are also possible. Also, the 2D parameterization regions shown in FIG. 4 are merely illustrative other parameterization regions are possible. The parameterization regions of the curves 545 and 585 are not shown. However, these curves 545 and 585 can also be divided in the manner described above. The same principle holds true for domains with higher dimensionalities, as well.

Figure 6:
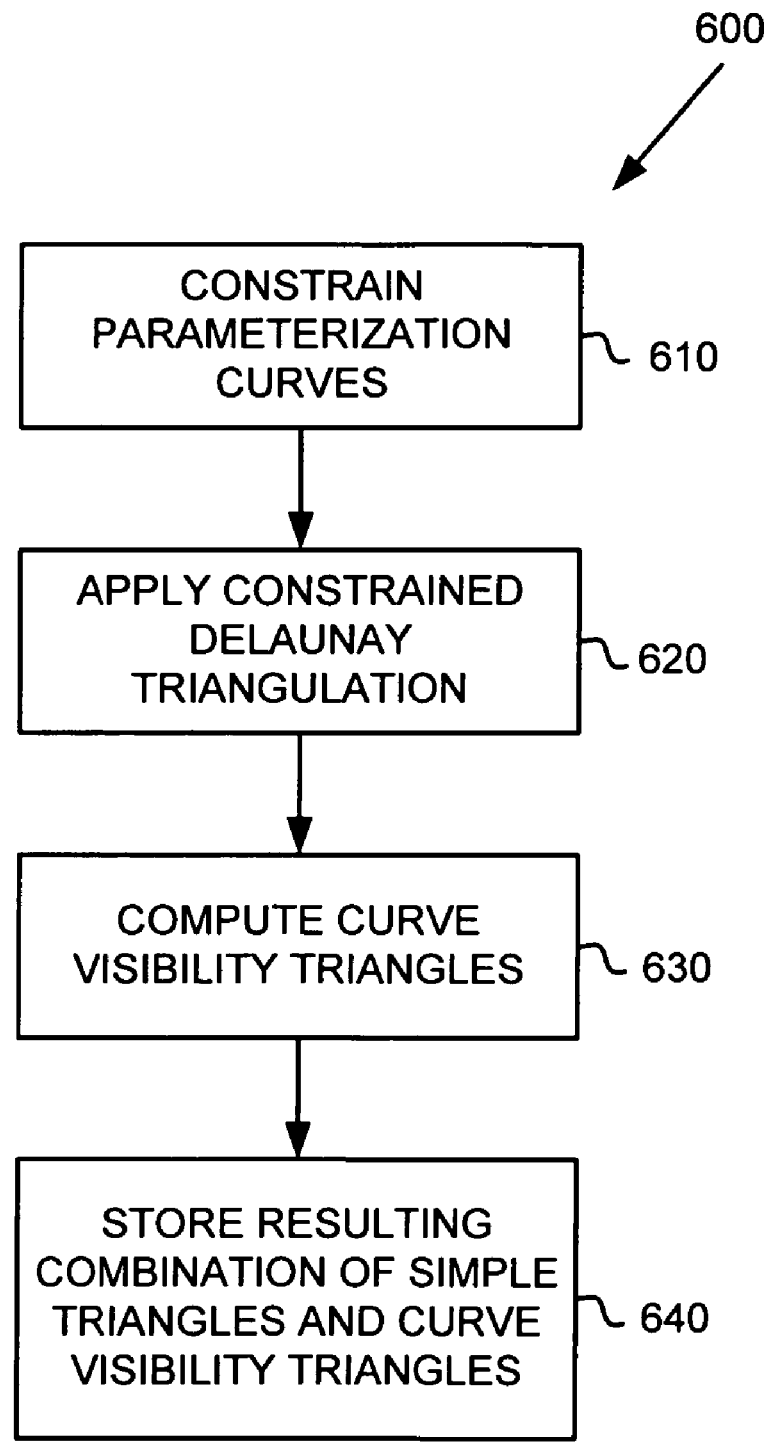
FIG. 6 is a flow diagram illustrating an exemplary overall method for statically generating a coarsely triangulated mesh representing domain based representations of procedural surfaces with implicit curves of intersection.

Exemplary Decomposition of Domains of Procedural Surfaces by Static Triangulation of the Domains Once a domain based representation of a CSG procedural surface (e.g., 500 and 550) is divided by parameterization regions (e.g., 515, 520, 525 and 530), the domain is further decomposed statically through a process of triangulation during pre-processing as described in the method 600 of FIG. 6. Triangulation divides the domain space into a connected mesh of triangles. At 610, the parameterization regions are constrained to add constraining edges and at 620, Delaunay triangulation is applied to constrained parameterization regions to yield the first set of coarse triangles triangulating the domain as shown at 750 in FIG. 7B, for instance. Later at 630, curve visibility triangles are determined to further refine the set of triangles resulting from the Delaunay triangulation. The resulting triangulated mesh is stored at 640 during pre-processing (as described above) to be refined further at runtime prior to rendering a scene comprising the CSG procedural surfaces in question.

Exemplary Constraints on Parameterization Regions

Figure 7A:
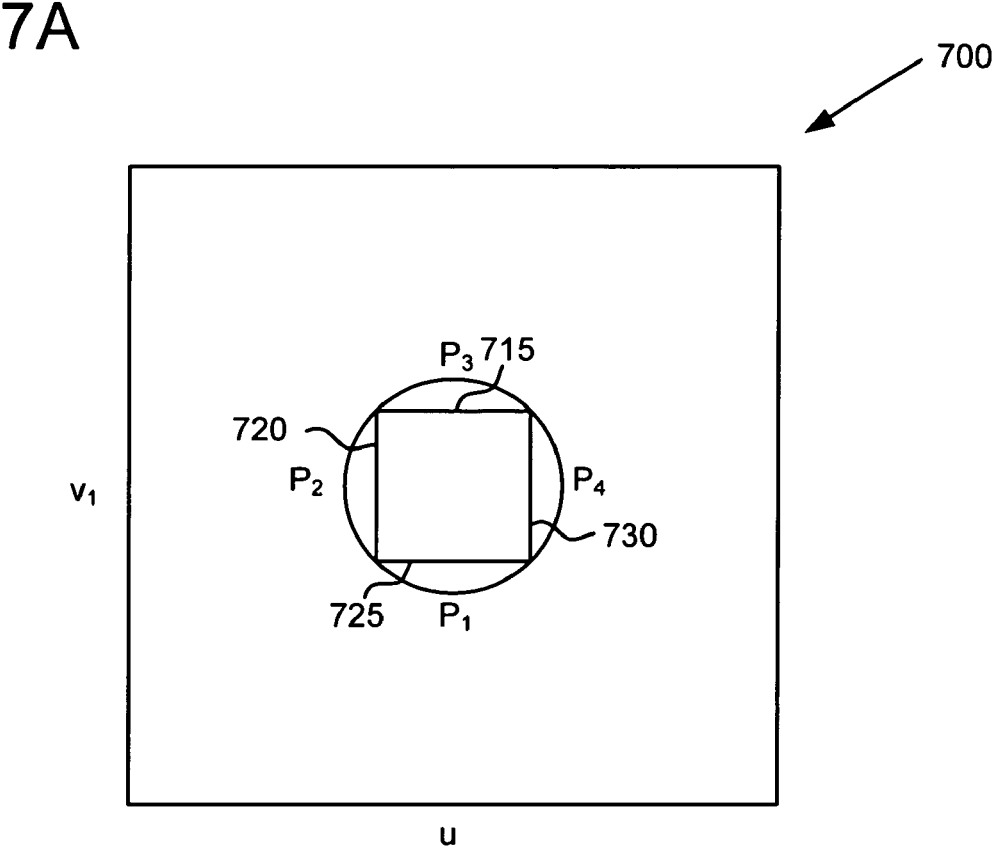
FIG. 7A is a block diagram illustrating exemplary constraints to implicit curves of intersection in a domain based representation of a procedural surface.
Figure 7B:
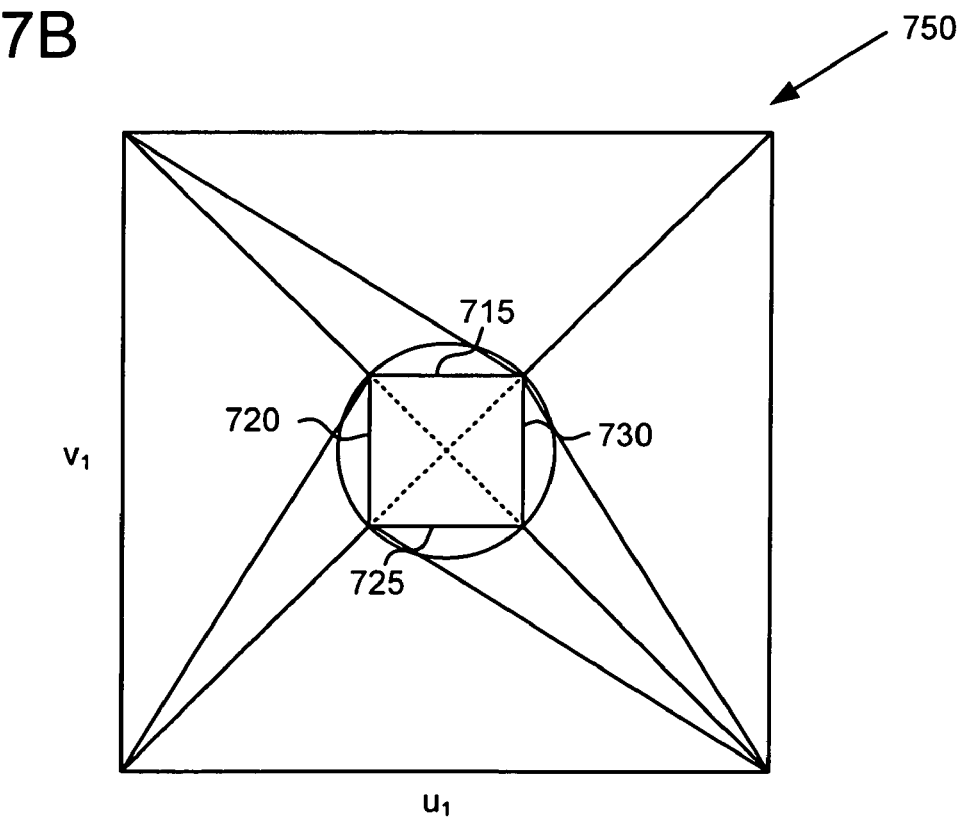
FIG. 7B is a block diagram illustrating an exemplary domain whose parameterized curves of intersection are constrained and triangulated with at least some triangles having the constraining edges.

FIG. 7A illustrates an exemplary domain 700 whose parameterized implicit curve of intersection 710 are constrained (610). The exemplary constraints are edges (e.g., 715, 720, 725 and 730) that simply connect the points (e.g., end points) of the parameterization regions $P_1$, $P_2$, $P_3$ and $P_4$. Once constrained, an initial process of triangulation triangulates the domain 700 as shown at 750 in FIG. 7B with constraints (e.g., 715, 720, 725 and 730) serving as bases of an initial coarse set of triangles. Such constraints ensure that any triangulation scheme will include the constraining edges (e.g., 715, 720, 725 and 730). However, the constraining edges (e.g., 715, 720, 725 and 730) are exemplary and other constraints are possible.

Figure 8A:
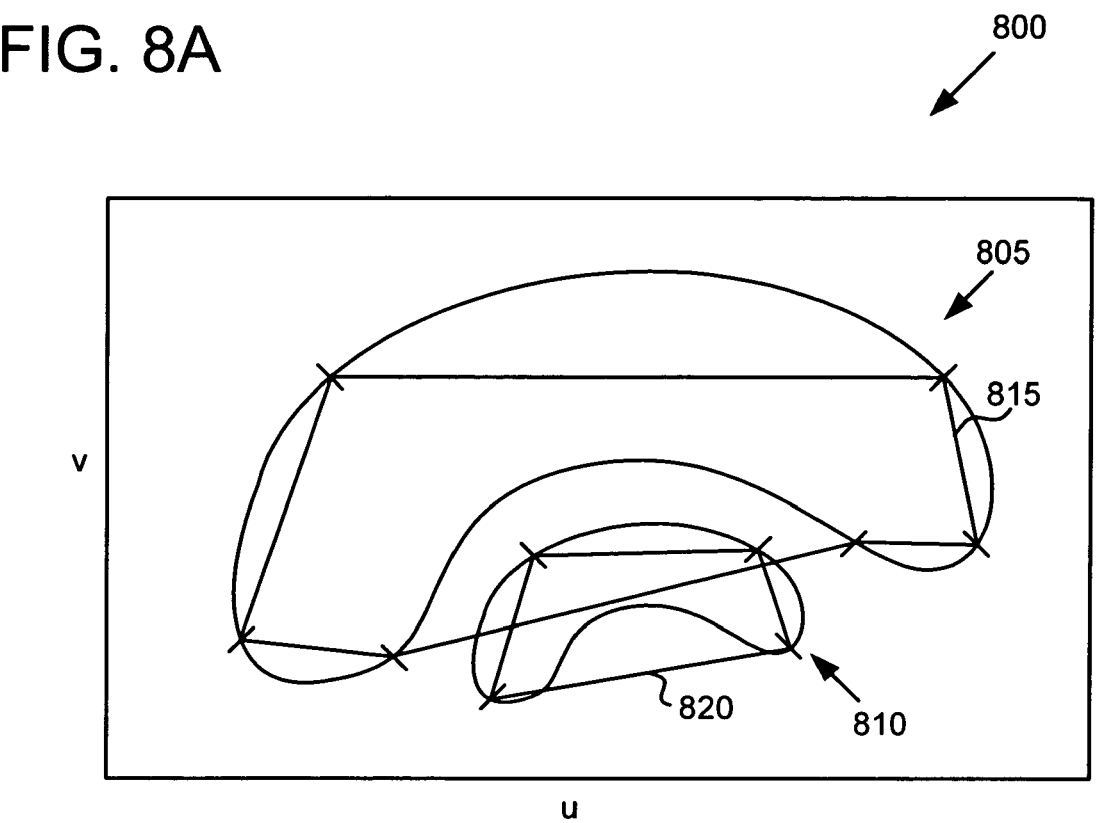
FIG. 8A is a block diagram illustrating implicit curves of intersection with one exemplary set of constraining edges wherein at least some of the constraining edges interfere with each other.
Figure 8B:
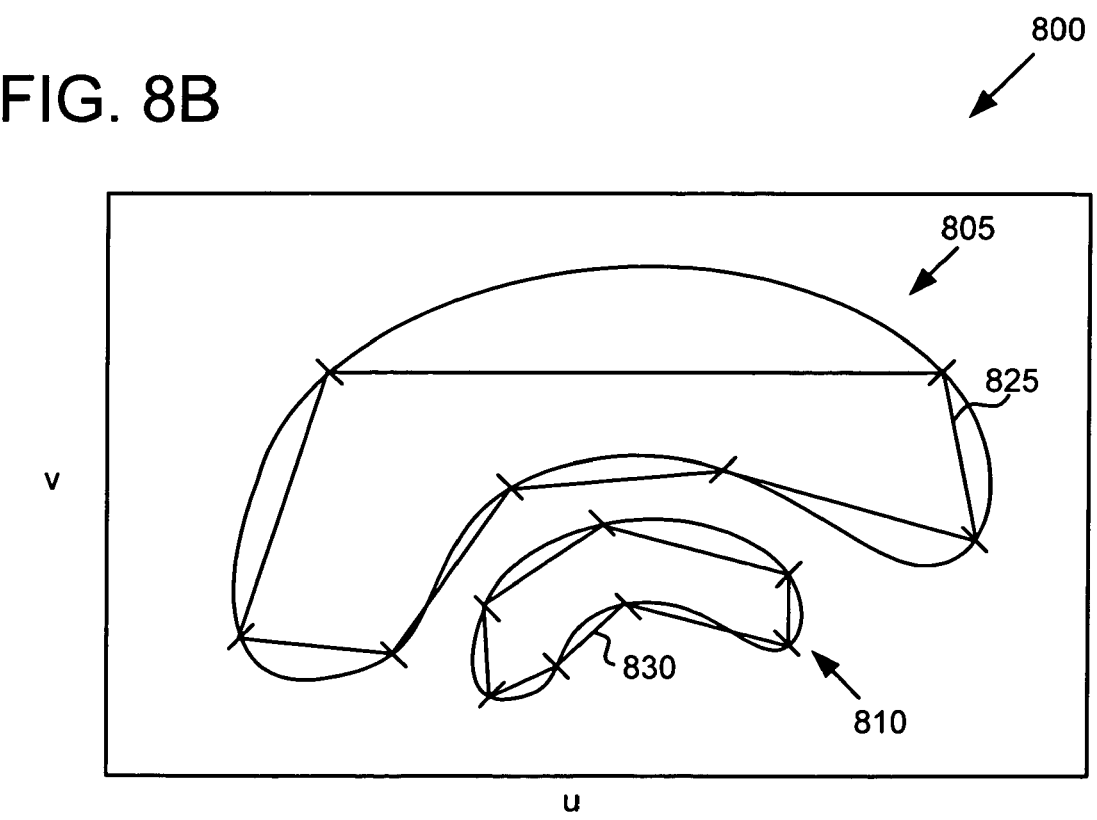
FIG. 8B is a block diagram illustrating implicit curves of intersection with another exemplary set of constraining edges wherein at least some of the parameterization regions of the curve are further sub-divided to avoid the interference between the respective constraining edges.

For instance, certain schemes of constraining edges could interfere with each other (e.g., through intersecting). FIG. 8A illustrates such an interference. The exemplary domain 800 may have multiple curves of intersection 805 and 810. However, if parameterization regions are not carefully selected then it is possible that a set of edges 815 of the curve 805 can interfere with a set of edges 820 of the curve 810. In that event, non-interfering constraints are applied to the parameterization regions in the manner shown in FIG. 8B by further sub-dividing the parameterization regions to yield a set of constrained edges (e.g., 830 and 825 in FIG. 8B) that avoid the interference evident in FIG. 8A.

Exemplary Delaunay Triangulation

Once non-interfering sets of constraining edges (e.g., 830 and 825) are determined (610), the Delaunay triangulation (620) is applied to such a constrained domain space. In computational geometry, Delaunay triangulation or Delone triangulation (as it is sometimes known) is a process which maximizes the smallest angle of the set of triangles that are triangulating a given domain space and thus avoids sliver triangles that are too thin. Thin sliver triangles are defined by one aspect wherein there is a substantial difference between the height of the triangle and its width. Such thin sliver triangles are unstable in computations and should be avoided. Stated generally, for a set of points P in an n-dimensional Euclidean space, the Delaunay triangulation is a triangulation DT(P) of P such that no point in P is inside the circumhemisphere of any simplex in DT(P). One method of applying Delaunay triangulation, calls for repeatedly adding one vertex at a time and re-triangulating the affected parts of the graph. When a vertex is added, a search is done for all triangles that have circumcircles containing the newly added vertex. Then, those triangles are removed and that part of the graph re-triangulated.

Figure 9:
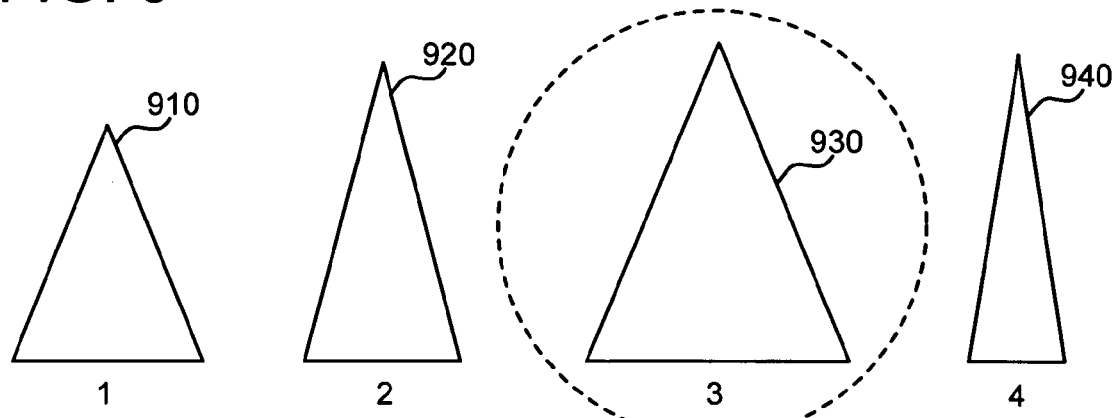
FIG. 9 is a block diagram illustrating exemplary thinnest sliver triangles of different triangulated meshes wherein according to Delaunay triangulation the mesh with the least thin sliver triangle is selected.

FIG. 9 illustrates the concept of Delaunay triangulation. Suppose different sets of triangles comprising different triangulations of domain have triangles 910, 920, 930 and 940 respectively as their thinnest sliver triangle defined in terms of the difference in their height and width then the triangulation scheme resulting in 930 as the thinnest sliver triangle will be picked to accomplish Delaunay triangulation so as avoid sliver triangles that are too thin such as at 940.

Exemplary Methods of Calculating Curve Visibility Triangles

Figure 10:
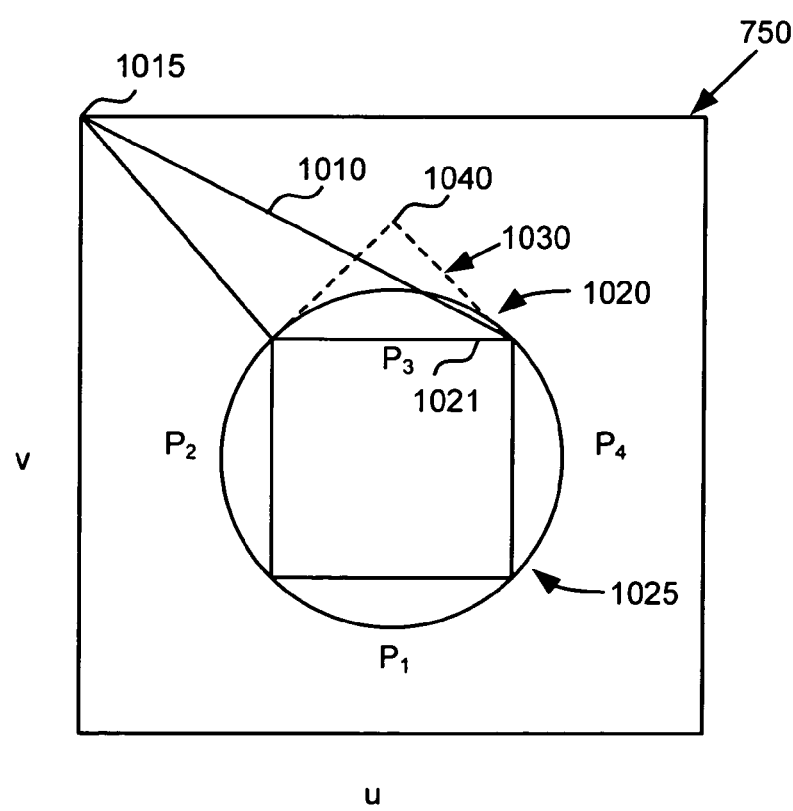
FIG. 10 is a block diagram illustrating an exemplary triangulated domain comprising at least one curve visibility triangle.

Once the process of Delaunay triangulation is complete, the domain is decomposed further to add visibility triangles (630 in FIG. 6). To do this, the triangles resulting from Delaunay triangulation, for instance, are searched to determine those whose bases (e.g., 1021) corresponds to one of the parameterization regions (e.g., $P_1$, $P_2$, $P_3$ and $P_4$) of the curve, for instance. FIG. 10 illustrates one such triangle at 1010 with its base corresponding to one of the parameterization regions $P_3$. However, some such triangles (e.g., 1010) may have an apex 1015 such that one or more of the sides of the triangle intersects the implicit curve of intersection 1025 in more than one place as shown at 1020, for instance. However, a new triangle 1030 with an apex at 1040 can be added to further sub-divide the domain 750 so that the curves of intersection 1025 are not intersected in more than one place by a triangle bounded on one side by an edge 1021 related to the curve 1025. In other words curve visibility triangles (e.g., 1030) have an apex (e.g., 1040) such that there is a clear path from the apex (e.g., 1040) to points on the curve 1025 within the parameterization region (e.g., $P_3$). This process can be repeated for the rest of the parameterization regions (e.g., $P_1$, $P_2$ and $P_4$).

Figure 11:
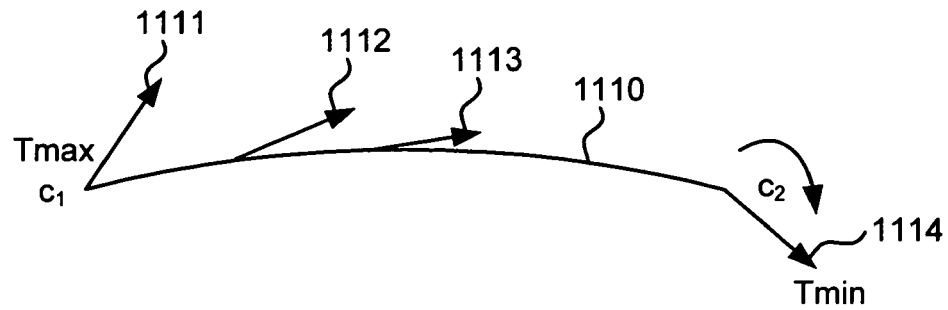
FIG. 11 is a block diagram for illustrating a method of calculating tangents to an exemplary implicit curve of intersection by implicit differentiation.
Figure 12:
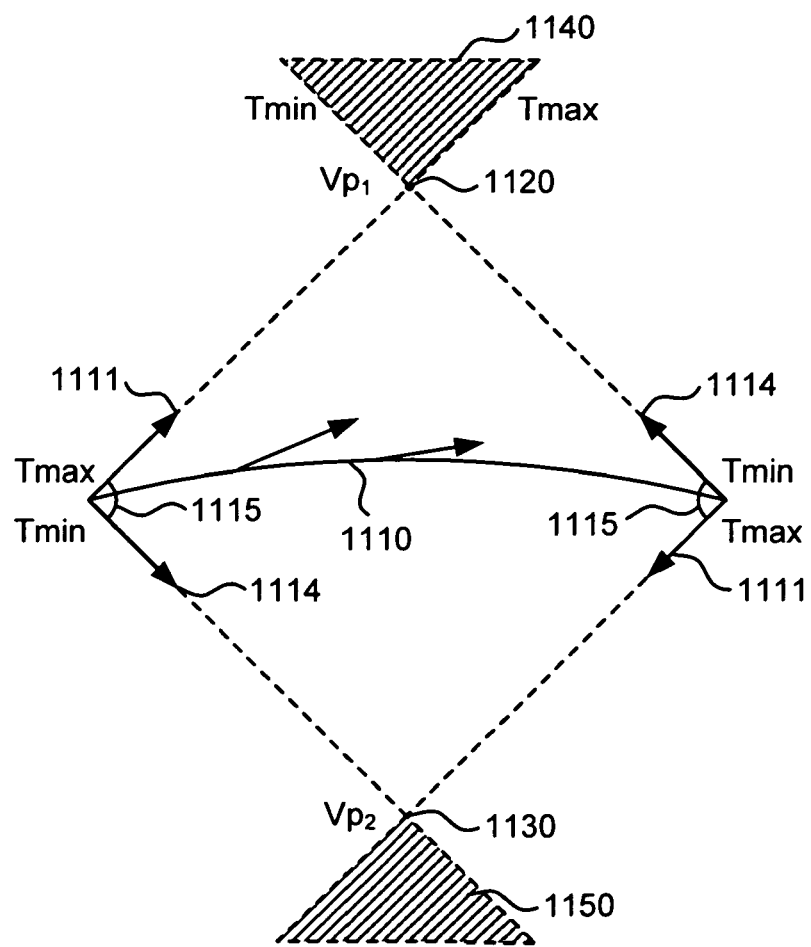
FIG. 12 is a block diagram illustrating exemplary curve visibility regions in a domain corresponding to an exemplary CSG implicit curve of intersection segment.

FIGS. 11 and 12 illustrate the exemplary methods of calculating the visibility triangles (e.g., 1030). Given a parameterization region on the implicit curve of intersection such as

1110, tangents to the curve are calculated by an implicit differentiation of the implicit function defining the curve over an interval ($\bar{x}_p$) of the parameterizing variable of the curve 1110 between end points $c_1$ and $c_2$ as shown in FIG. 11. This yields a range of tangents (e.g., 1111-1114) with different values of slope. From the range of tangents (e.g., 1111-1114) a tangent $T_{max}$ with a maximum slope value (e.g., at 1111) and tangent $T_{min}$ (e.g., at 1114) with a minimum slope value are identified.

As shown in FIG. 12, the difference in the angle 1115 between $T_{max}$ at 1111 and $T_{min}$ at 1114 defines the range of slopes of the tangents to the interval ($\bar{x}_p$) of a parameterizing variable of the curve 1110. Based on the range 1115, the points of intersection of the curves $v_{p1}$ 1120 and $v_{p2}$ 1130 are determined. As a result, any point in the regions 1140 and 1150 can be selected to be an apex of a curve visibility triangle (e.g., 1020 and 1030) such that any point on the curve 1110 can be joined to the apex to form a line without such a line intersecting the curve 1110 in any other place.

The example in FIGS. 11-12 shows a simple case wherein the curve is such that maximum slope tangent $T_{max}$ and the minimum slope tangents $T_{min}$ happen to coincide with the endpoints $c_1$ and $c_2$ of the parameterization region of curve 1110. Depending on the curve, this may not always be the case. For instance, either or both of the tangents $T_{max}$ and $T_{min}$ might correspond to points other than the end points of the curve 1110. Nevertheless, the curve visibility regions (e.g., 1140 and 1150) are determined by finding the intersection of the tangents $T_{max}$ and $T_{min}$ by translating the tangents to the end points $c_1$ and $c_2$. Also, curve visibility triangles can have as is apex any point in the curve visibility regions 1140 and 1150. It does not have to be the points of intersections $v_{p1}$ 1120 and $v_{p2}$ 1130.

Figure 13A:
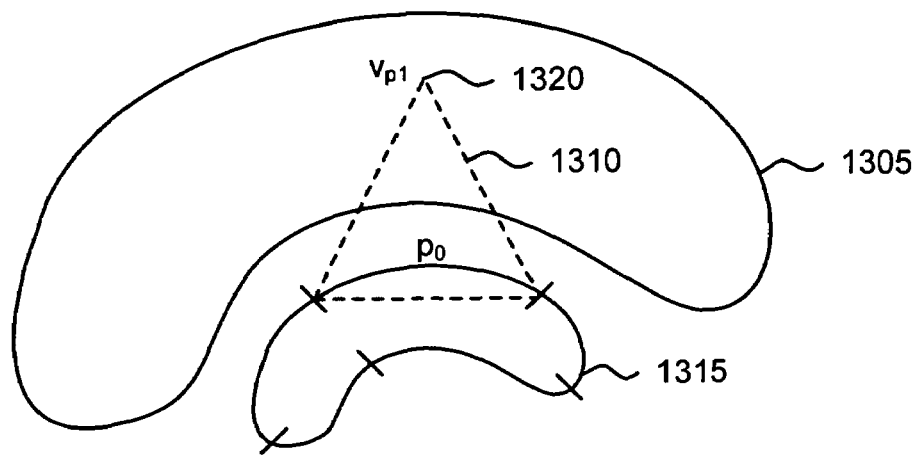
FIG. 13A is a block diagram illustrating an exemplary curve visibility triangle wherein the curve visibility triangle associated with a first implicit curve interferes with a second curve.
Figure 13B:
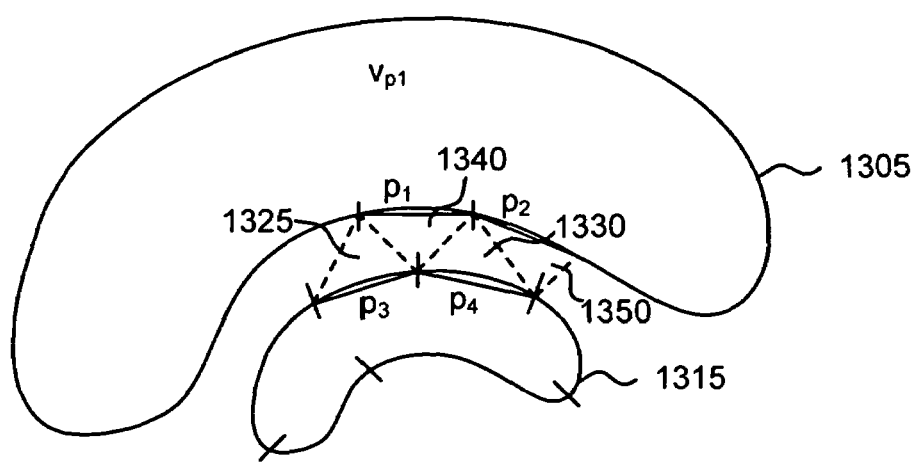
FIG. 13B is a block diagram illustrating curve visibility triangles wherein the curve visibility triangles of different implicit curves do not intersect with each other.

In selecting the location of the apex for a curve visibility triangle one other consideration is described with reference to FIGS. 13A and 13B. For instance, the apex $v_{p1}$ (1320) of the curve visibility triangle 1310 at FIG. 13A corresponds to the implicit curve 1315 but with the location of the apex at $v_{p1}$ (1320) the curve visibility triangle 1310 intersects with a second implicit curve 1305, which is not desirable. Such interference can be avoided by sub-dividing the parameterization region $P_0$ in FIG. 13A into regions $P_3$ and $P_4$ in FIG. 13B such that the corresponding curve visibility triangles 1325 and 1330 do not interfere with the second implicit curve 1305. Likewise, in FIG. 13B the curve visibility triangles 1340 and 1350 associated with the curve 1305 have parameterization regions $P_1$ and $P_2$ sub-divided so that the triangles do not interfere with the implicit curve 1315.

Exemplary Results of Static Triangulation

Figure 14:
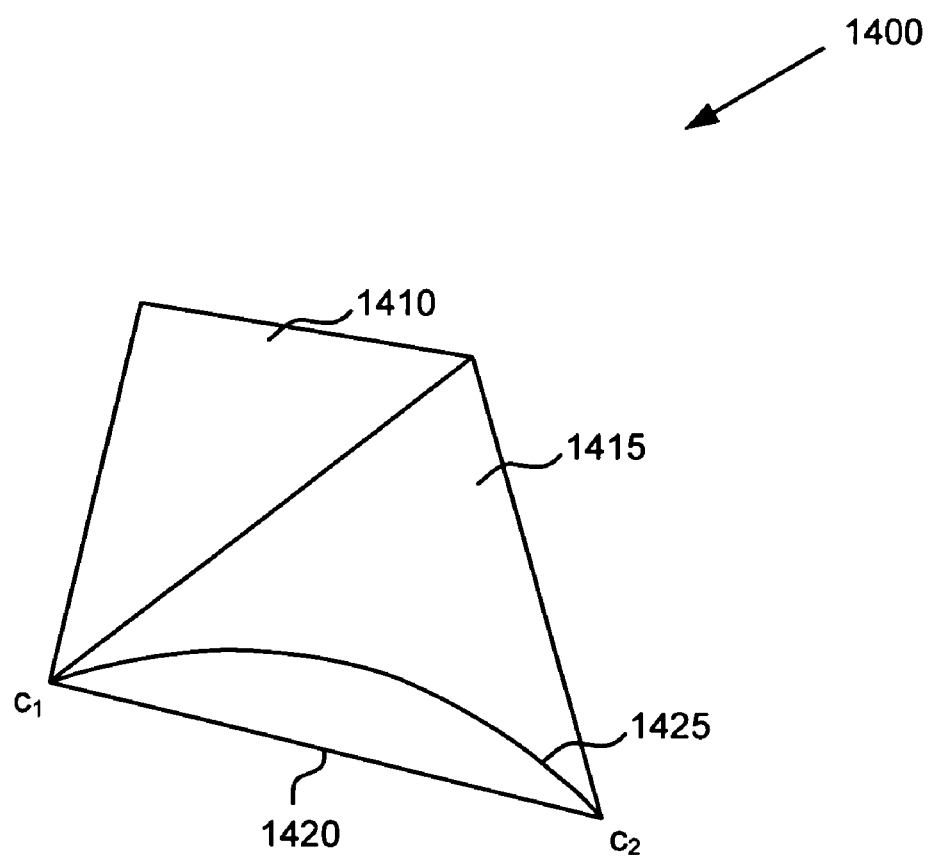
FIG. 14 is a block diagram illustrating at least a portion of a domain statically triangulated during pre-processing to generate some combination of simple domain triangles and curve visibility triangles.

FIG. 14 illustrates at least a portion 1400 of a domain after an exemplary static triangulation (e.g., by the method of 600 in FIG. 6) comprising a simple domain triangle 1410 having non-curve based domain edges on all its three sides and a curve visibility triangle 1415 having a constraining edge 1420 on at least one of its three sides. The constraining edge 1420 connects points on the implicit curve of intersection 1425 such as the endpoints $c_1$ and $c_2$. Data related to vertices of the simple domain triangles (e.g., 1410) and curve visibility triangles (e.g., 1415) are stored (640 of FIG. 6) and retrieved later during runtime to further refine the triangulation.

Exemplary Runtime Triangulation

Figure 15:
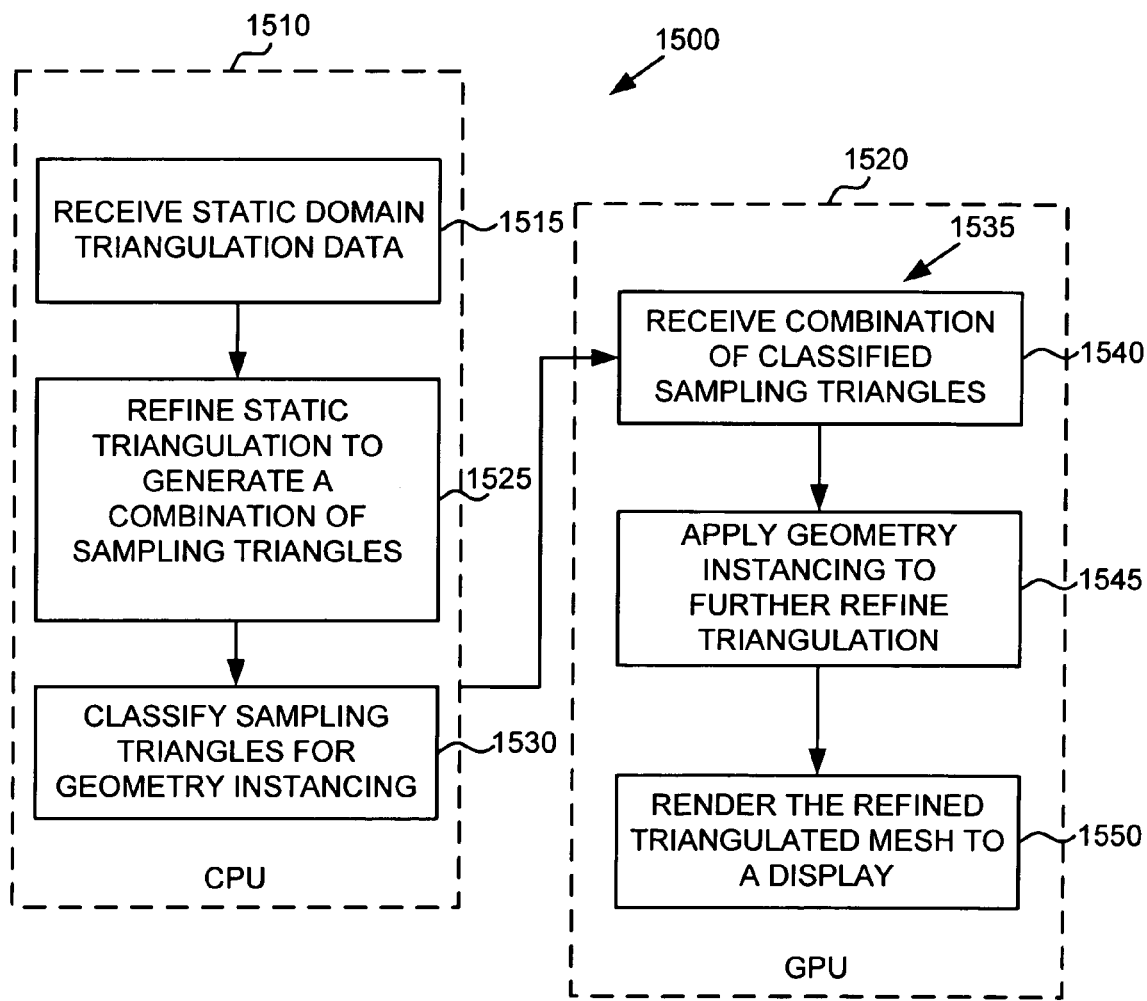
FIG. 15 is a flow diagram illustrating an exemplary overall method for runtime triangulation of a domain by refining the statically generated coarsely triangulated mesh.

Once static triangulation is complete, the coarse triangulated mesh (e.g., 1400) is further refined at runtime to generate a more refined mesh. Generating the more refined triangulated mesh at runtime avoids the costs associated with storing and retrieving a detailed mesh for rendering. FIG. 15 illustrates an overall method 1500 for runtime triangulation by both the CPU 1510 and the GPU 1520. A part 1505 of the runtime triangulation is performed by the CPU 1510. At 1515, a triangulation program running on the CPU 1510 receives data related to static triangulation (e.g., 600 of FIG. 6) performed during pre-processing. The data, at least includes vertex data associated with a coarse set of triangles (e.g., 1400) triangulating the domains of the CSG surfaces to be displayed. For instance, such data includes data having domain based coordinates of vertices of the simple triangles (e.g., 1410 of FIG. 14) and vertices of the curve visibility triangles (e.g., 1415) resulting from static triangulation methods described above. At 1525, such static triangulation is further refined by sub-dividing any simple triangles (e.g., 1410) by adding edges in the domain and by further sub-dividing the curve visibility triangles (e.g., 1415). Such sub-division can continue up to a user defined parametric length of the edges forming the sides of a triangle.

Figure 16:
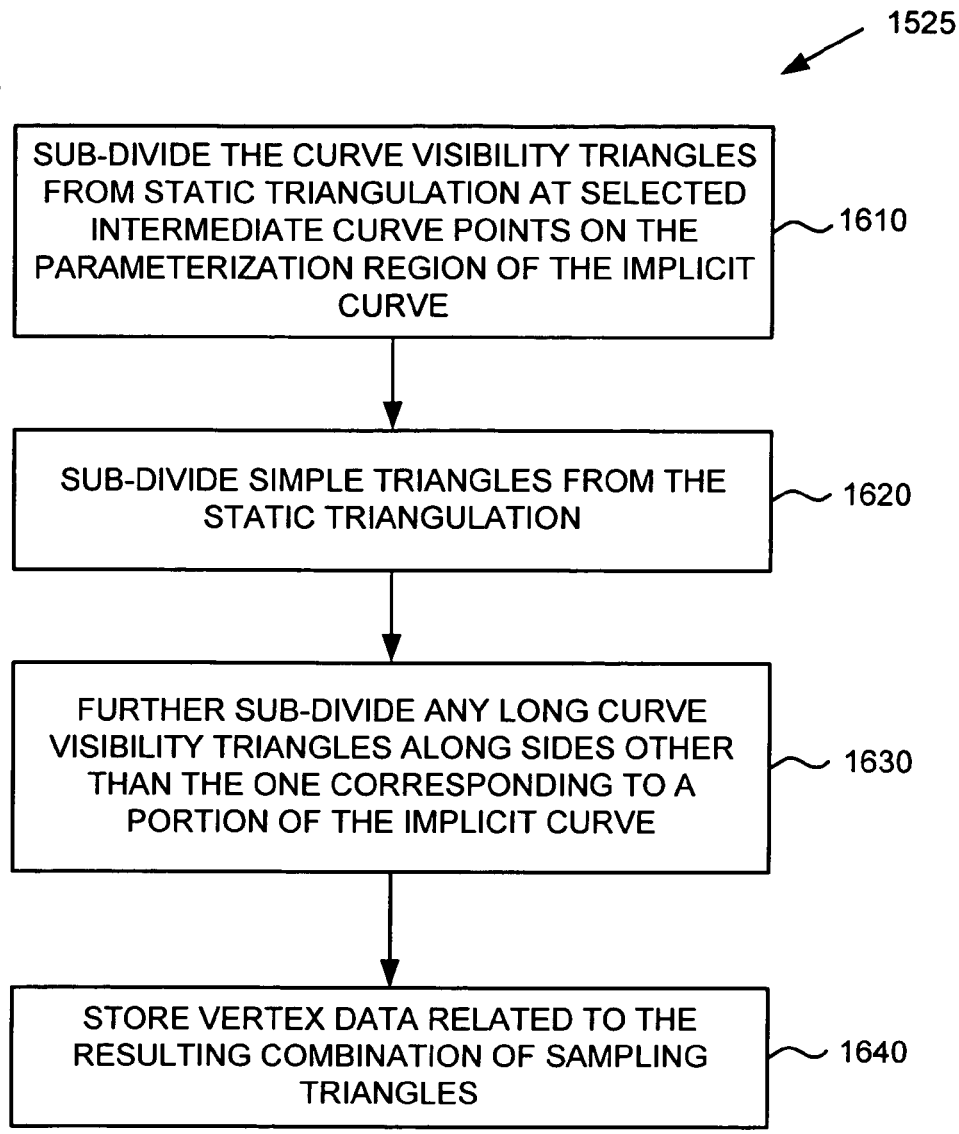
FIG. 16 is a flow diagram illustrating an exemplary method for refining a statically generated coarsely triangulated mesh at runtime to generate a more refined mesh of sampling triangles.
Figure 17A:
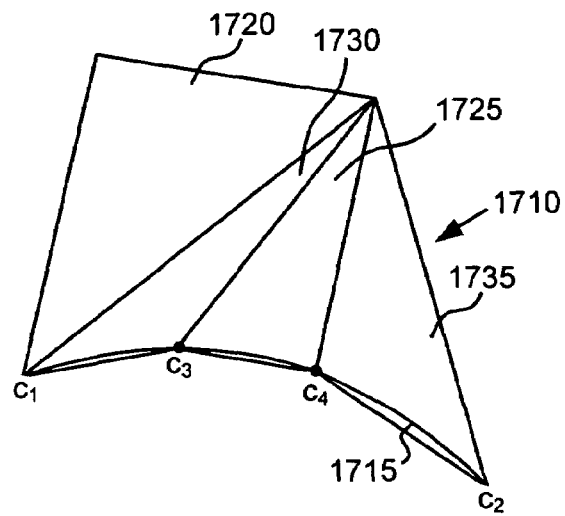
FIG. 17A is a block diagram illustrating at least a portion of a statically triangulated coarse mesh further sub-divided by adding curve visibility triangles to correspond to additional edges added along the implicit curve of intersection.
Figure 17B:
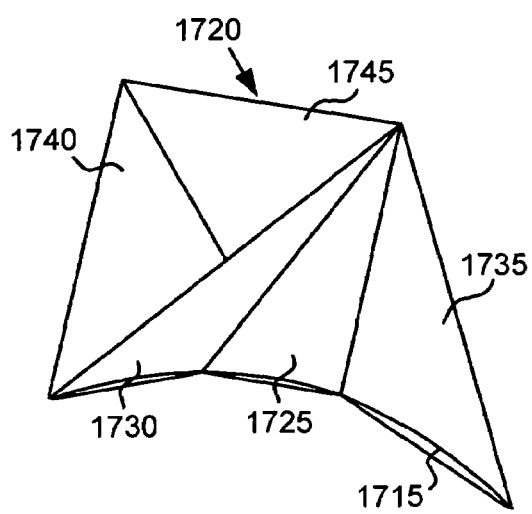
FIG. 17B is a block diagram illustrating at least a portion of a statically triangulated coarse mesh further sub-divided by adding edges within simple sampling triangles not bounded by curve based edges.

One method 1525 of refining the statically triangulated mesh is described with reference to FIG. 16. At 1610, the curve visibility triangles (e.g., 1415) resulting from static triangulation are sub-divided further adding further edges at additional points on the parameterization regions of the implicit curve. FIG. 17A illustrates one such sub-division wherein the curve visibility triangle 1710 is further sub-divided into triangles 1725, 1730 and 1735 by adding the edges connecting additional curve points at $c_3$ and $c_4$ intermediate to the endpoints $c_1$ and $c_2$ of the parameterization region curve 1715. These curve points (e.g., $c_1$, $c_2$, $c_3$ and $c_4$) specified in coordinates of the domain can be retrieved from memory. Such points can also be calculated at runtime by solving the implicit function defining the implicit curve of intersection 1715. At 1630, the simple triangles (e.g., 1720 as shown in FIG. 17B) are also sub-divided further by adding edges (e.g., 1750) to generate more triangles at 1740 and 1745 as shown in FIG. 17B, for instance. Such sub-division is at least in part based on a user defined threshold parametric length for edges forming sides of the sub-divided triangles of a mesh.

Based on the edges added (e.g., 1750) to generate subdivided simple triangles at 1740 and 1745, a new edge 1755 is added to ensure that the shared edges between sub-divided triangles (e.g., 1730, 1740 and 1745 of FIG. 17B) are not inconsistent. Inconsistency occurs when one triangle's edges do not match with the shared edges of another triangle. For instance, if the edge 1750 did not meet with the edge 1755 it would result in an inconsistency. Such inconsistencies can result in unwanted breaks on the surface represented by the triangulated mesh when it is finally rendered on a screen. Minimizing such inconsistencies improves the overall quality of the rendered image.

Figure 17C:
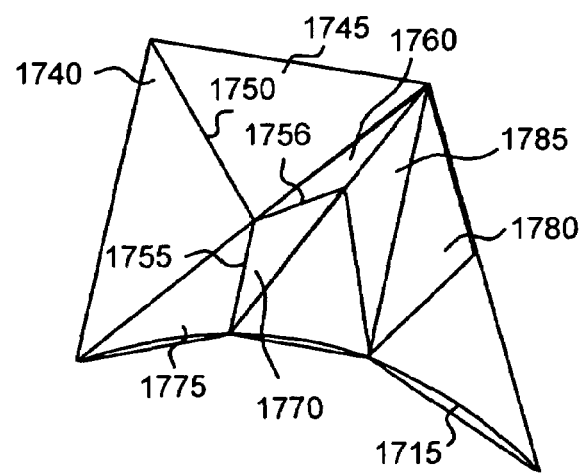
FIG. 17C is a block diagram illustrating at least a portion of statically triangulated coarse mesh further sub-divided by adding edges within the runtime generated curve visibility triangles to generate a more refined mesh of sampling triangles.

Further edges 1756 are also added to meet the user set parametric threshold length requirement, for instance. Thus, new triangles 1760, 1770 and 1775 in FIG. 17C are added to represent a portion of the domain initially represented by the curve visibility triangle 1730 in FIG. 17B. Addition of edges (e.g., 1756) causes adjacent triangles 1725 and 1735 in FIG. 17B to be sub-divided further to add triangles such as 1785 and 1780. Such sub-division results in a combination of triangles as shown in FIG. 17C referred to as instances of sampling triangles. Data related to vertices of this combination of runtime sub-divided sampling triangles are stored at 1640.

Returning to FIG. 15, the sampling triangles determined in step 1525 as described above are classified based on such characteristics such as their shape, size and location relative to the curve of intersection. For instance, such classifications include but are not limited to a runtime sub-divided curve visibility triangle (e.g., 1775 in FIG. 17B) bounded on one side by an edge connecting points on a curve of intersection 1715 generated by sub-dividing the original visibility triangle (e.g., 1415 in FIG. 14) determined during static triangulation (e.g., by the method 600 of FIG. 6). A further classification also includes a non-curve based simple triangle (e.g., 1740 and 1745 in FIG. 17B) not bounded on any side by an edge related to the curve of intersection (e.g., 1715). Yet another classification includes non-curve based triangles such as 1760, 1770, 1780 and 1785 that were generated from sub-dividing the original curve visibility triangle (e.g., 1415 in FIG. 14) determined during static triangulation (e.g., by the method 600 of FIG. 6). Data related to such classification can be maintained by adding a moniker (e.g. alphanumeric) to identify the classification associated with each of sampling triangles (FIG. 17C) resulting from runtime triangulation 1525.

Returning again to FIG. 15, further at runtime, the GPU 1520 at 1540 implements another method 1535 of further refining the triangulation. According to the method 1535, at 1540 the GPU receives vertex data of the sampling triangles (e.g., as in FIG. 17C) and data classifying the triangles as different types of the sampling triangles. Then at 1545, based on the classifications, the GPU 1520 applies geometry instancing to add further edges to the sampling triangles to further refine the triangulated mesh (e.g., FIG. 17C) prior to rendering the refined mesh at 1550. In this manner, additional triangulation can be implemented at runtime to further define the details of a CSG procedural surface including any curves of intersection without having to store complicated data structures defining complex meshes. Exemplary methods of applying geometry instancing (1545) are described below.

Exemplary Methods of Geometry Instancing for Refined Triangulation

Figure 18:
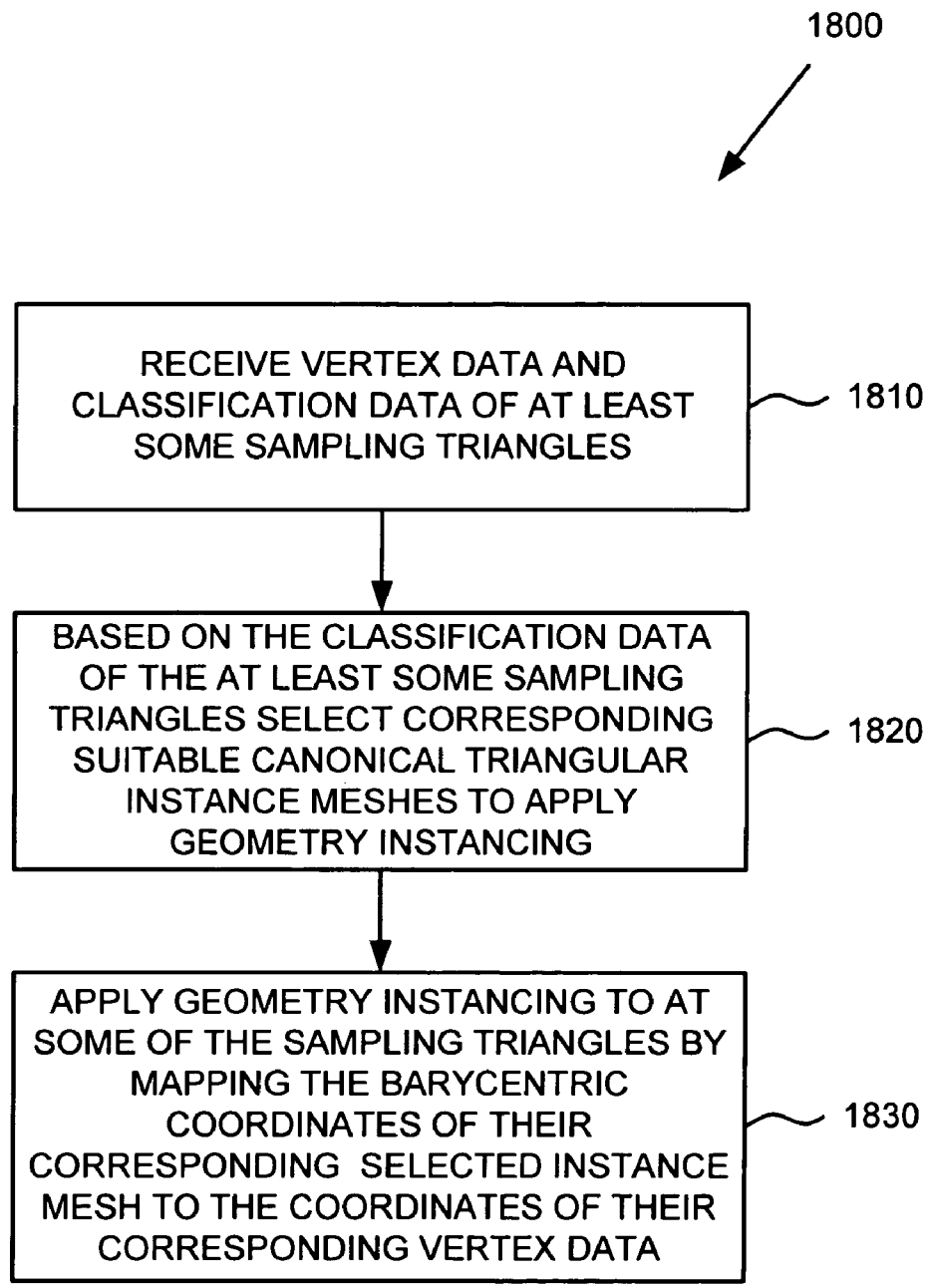
FIG. 18 is a flow diagram illustrating an exemplary method of applying geometry instancing to further refine a mesh of runtime generated sampling triangle mesh.

FIG. 18 illustrates an exemplary method 1800 of applying geometry instancing. At 1810, vertex data of sampling triangles such as the ones forming the mesh illustrated in FIG. 17C is received by a vertex shader program running on a GPU (e.g., 1520 of FIG. 15), for instance. In addition to the vertex data, data for classifying the sampling triangles into different types of triangles is also received. At 1820, based at least in part on the classification of the sampling triangles an appropriate canonical geometry instancing mesh is selected for at least some of the sampling triangles. Then at 1830, for at least some of the sampling triangles, based on the vertex data of the sampling triangles and the barycentric coordinates of geometry instancing mesh associated therewith, triangles represented within the instance mesh are mapped into the sampling triangles.

Exemplary Methods of Mapping Geometry Instancing Meshes into Sampling Triangles

Figure 19:
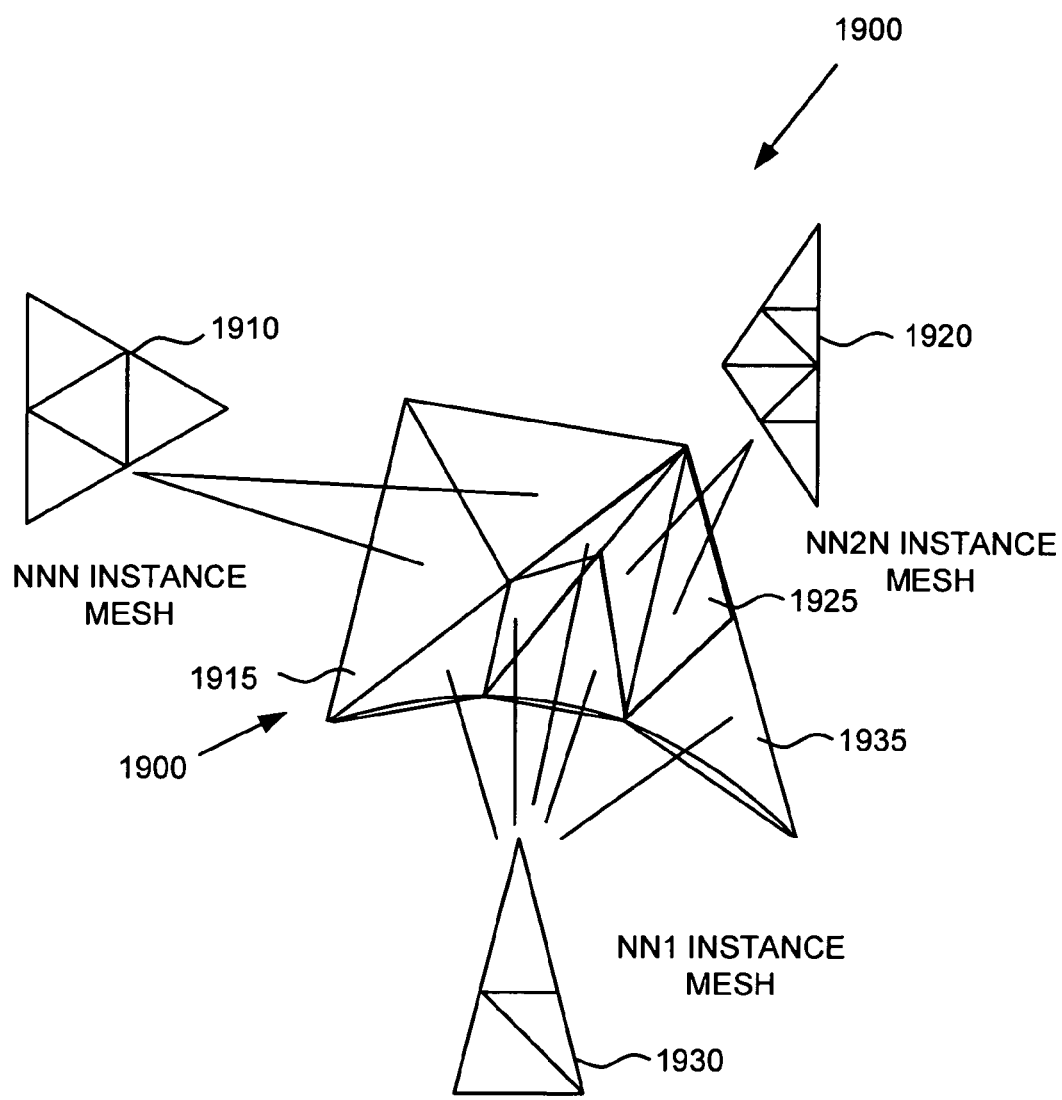
FIG. 19 is a block diagram illustrating an exemplary mapping of various types of geometry instance meshes to appropriate triangles of a sampling triangle mesh.
Figure 20:
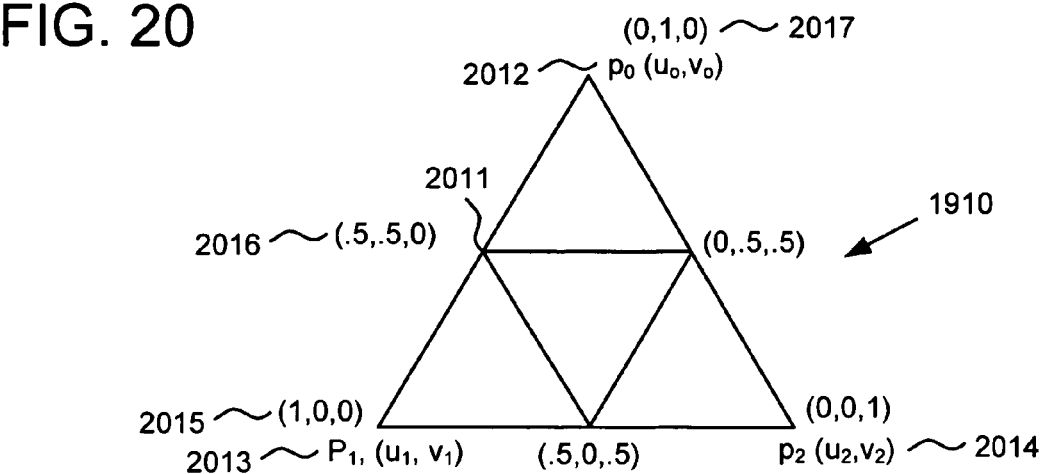
FIG. 20 is a block diagram illustrating an exemplary set of different types of geometry instance meshes including their corresponding barycentric coordinates.
Figure 20:
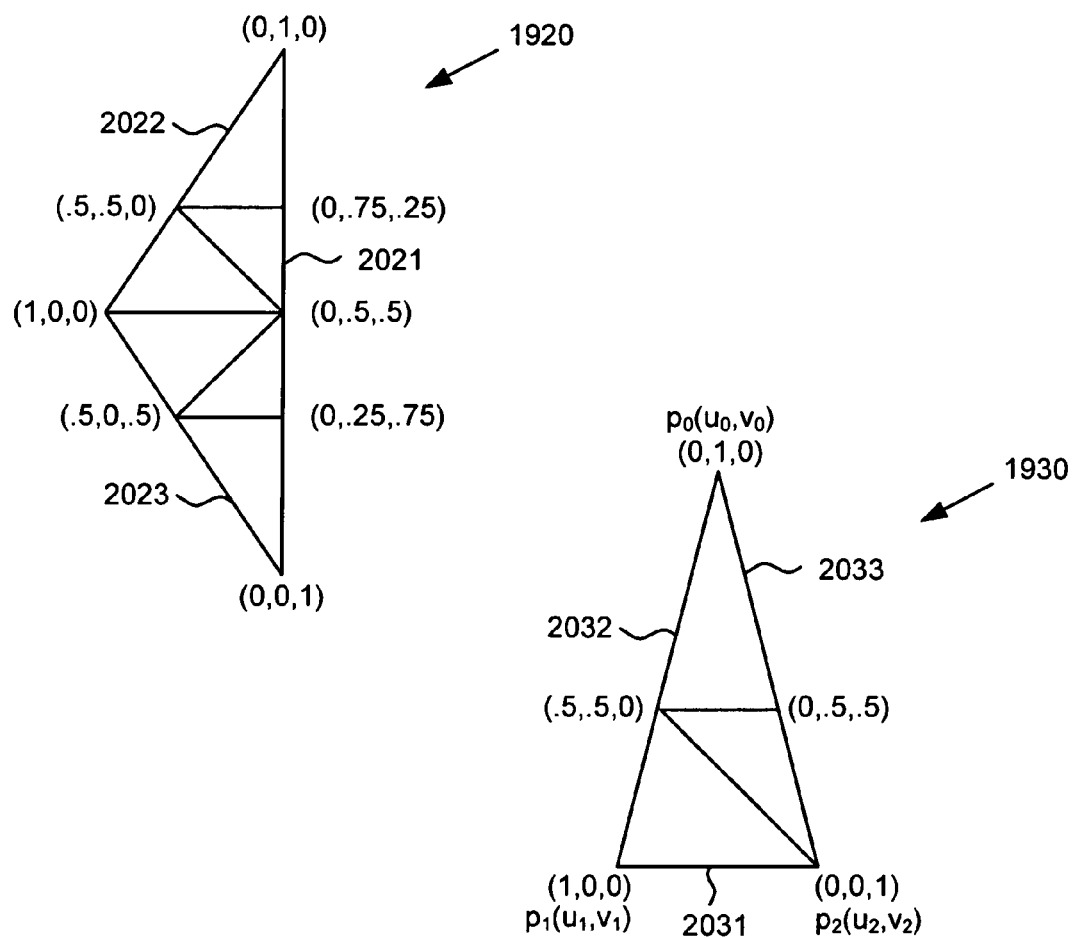

FIG. 19 illustrates an exemplary mapping. The sampling triangle mesh 1900 is triangulated further by appropriately mapping the instance meshes (e.g., 1910, 1920 and 1930). FIG. 20 illustrates three examples of the instance mesh types 1910, 1920 and 1930 in additional detail including their barycentric coordinates. In an exemplary set of criteria for selecting the appropriate instance mesh to be mapped to a particular type of sampling triangle, a runtime sub-divided simple sampling triangle such as 1915 in FIG. 19 is mapped with a NNN type triangle such as the one at 1910. A runtime sub-divided curve visibility triangle such as 1935 is mapped with a NN1 type instance mesh such as the one at 1930. Finally, a non-curve based triangle 1925 resulting from the runtime sub-division of static curve visibility triangle (e.g., 1415 from FIG. 14) is mapped with a NN2N type triangle such as the one at 1920 and depending on the configuration of the adjacent triangles, such non-curve based triangles can also be mapped with a NN1.

The notation N refers to the approximate number of line segments between barycentric points (e.g., between 2011 and 2012 in FIG. 20) associated with the canonical instance mesh (e.g., 1910, 1920 and 1930). For instance, at 1910 N is 2 because the number of edges corresponding to barycentric points on each side of the triangle mesh 1910 is 2 on each side. Similarly, the NN2N mesh at 1920 has 4 segments along the base 2021 and 2 segments along the other two sides 2022 and 2023. The triangle mesh 1930 is of the type NN1 and in this example N is also 2 since the base 2031 has just 1 segment whereas the other two sides 2032 and 2033 have 2 segments. As in the example, having the N be equal for each of the various types of the geometry instances meshes (e.g., 1910, 1920 and 1930) ensures that a refined runtime triangulated mesh after geometry instancing has no inconsistent edges.

Inconsistent edges along adjacent triangles are also avoided by selecting the appropriate type of instance mesh (e.g., 1910, 1920 and 1930) to map to a selected sampling triangle. For instance, in FIG. 17C non-curve based triangles such as 1760 and 1770 generated from sub-dividing the original curve visibility triangle (e.g., 1415 in FIG. 14) are mapped with a NN1 type (1930 in FIG. 19) instance mesh instead of NN2N type (1920 in FIG. 19) in order to avoid inconsistent edges with adjacent triangles 1740 and 1745 to be mapped with a NNN type (1910 in FIG. 19) mesh. Also, sampling triangles 1760 and 1770 of FIG. 17C are mapped with a NN1 mesh instead of a NN2N mesh to ensure consistency with edges of their adjacent sampling triangles (e.g., 1745 and 1775).

The triangles 1910, 1920, and 1930 having values of N illustrated as 2 and corresponding barycentric points are merely illustrative and as such can be changed based on the particular domain being triangulated and other factors such as a scope and depth of triangulation desired. Minimizing inconsistencies between shared edges of a triangulated mesh will ultimately result in better quality of rendered pictures.

An Exemplary Algorithm for Mapping Triangular Instance Meshes to Sampling Triangles Barycentric coordinates define points along the sides of a canonical triangular mesh based on a set of coefficients (e.g., (0, 1, 0) at 2017 in FIG. 20, (0.5, 0.5, 0) at 2016 and (0, 0, 1) at 2014. Based on these coefficient type barycentric coordinate values, the actual coordinates in a chosen domain for representing these points are calculated during the mapping of such meshes onto the appropriate sampling triangle (e.g., as illustrated in 1900). The actual domain coordinates for the intermediate barycentric points (e.g., 2016 in FIG. 20) are calculated in relation to the known coordinate values in domain coordinates of the vertices $p_0$ 2012 ($u_0$, $v_0$), $p_1$ 2013 ($u_1$, $v_1$), and $p_2$ 2014 ($u_2$, $v_2$).

FIG. 21 is a listing 2100 of an exemplary algorithm that describes the process of mapping instance meshes to sampling triangles. According to this method, based on an input of barycentric coordinates 2115 in form of coefficients in an (x,y,z) form and 2D domain coordinates (u,v) at 2120 for the vertices $p_0$, $p_1$, and $p_2$. At 2130, the domain coordinates (u,v) for the barycentric points are calculated based on their coefficient values and the known domain coordinate values of the vertices $p_0$, $p_1$, and $p_2$. The algorithm in the listing is exemplary. Other methods can be used to determine points on the domain representation of the surface to represent vertex data of a triangulated mesh based on geometry instancing.

Exemplary Computing Environment

Figure 22:
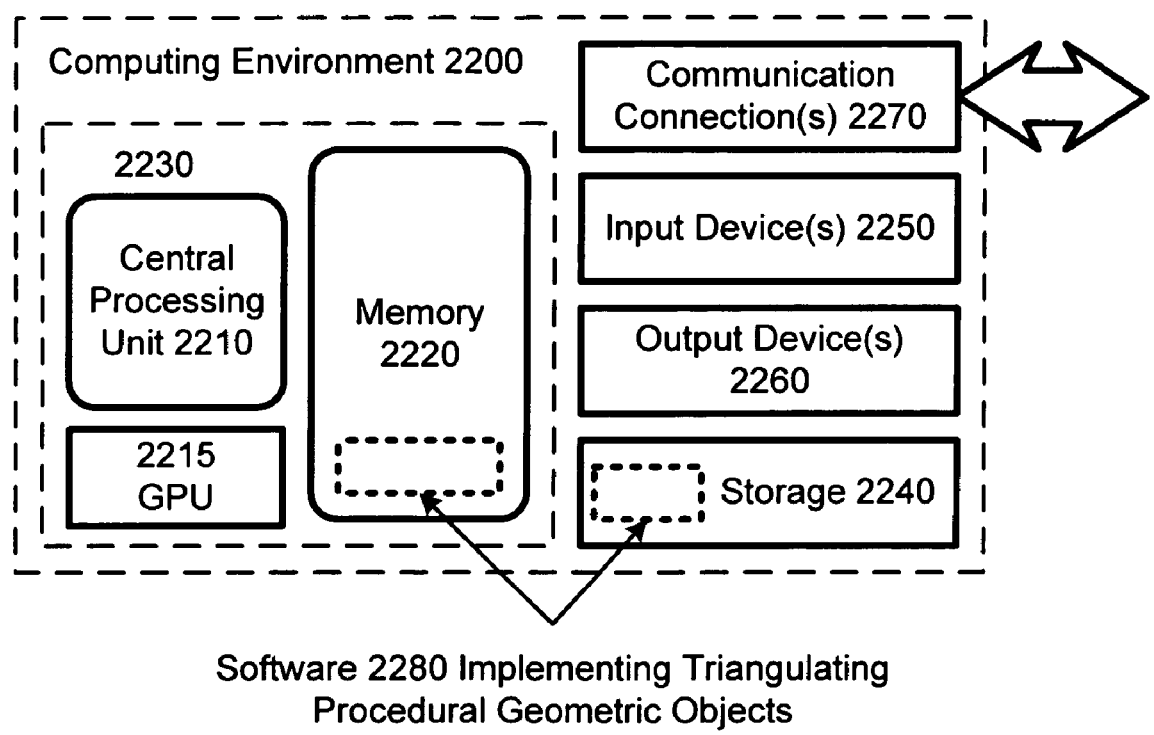
FIG. 22 is a block diagram illustrating an exemplary computing environment for implementing the methods of triangulating procedural geometric objects.

FIG. 22 and the following discussion are intended to provide a brief, general description of an exemplary computing environment in which the disclosed technology may be implemented. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 22 illustrates a generalized example of a suitable computing environment (2200) in which described embodiments may be implemented. The computing environment (2200) is not intended to suggest any limitation as to scope of use or functionality of the invention, as the present invention may be implemented in diverse general-purpose or special-purpose computing environments.

With reference to FIG. 22, the computing environment (2200) includes at least one central processing unit (2210) and memory (2220). In FIG. 22, this most basic configuration (2230) is included within a dashed line. The central processing unit (2210) executes computer-executable instructions and may be a real or a virtual processor. The environment 2200 further includes the graphics processing unit (GPU) at 2215 for executing such computer graphics operations as vertex mapping, pixel processing, rendering, and texture mapping. In a multi-processing system, multiple processing units execute computer-executable instructions to increase processing power and as such the GPU and CPU can be running simultaneously. The memory (2220) may be volatile memory (e.g., registers, cache, RAM), non-volatile memory (e.g., ROM, EEPROM, flash memory, etc.), or some combination of the two. The memory (2220) stores software (2280) implementing the described methods of triangulating procedural geometric objects. A computing environment may have additional features. For example, the computing environment (2200) includes storage (2240), one or more input devices (2250), one or more output devices (2260), and one or more communication connections (2270). An interconnection mechanism (not shown) such as a bus, controller, or network interconnects the components of the computing environment (2200). Typically, operating system software (not shown) provides an operating environment for other software executing in the computing environment (2200), and coordinates activities of the components of the computing environment (2200).

The storage (2240) may be removable or non-removable, and includes magnetic disks, magnetic tapes or cassettes, CD-ROMs, CD-RWs, DVDs, or any other medium which can be used to store information and which can be accessed within the computing environment (2200). The storage (2240) stores instructions for the software (2280) implementing methods of triangulating procedural geometric objects.

The input device(s) (2250) may be a touch input device such as a keyboard, mouse, pen, or trackball, a voice input device, a scanning device, or another device that provides input to the computing environment (2200). For audio, the input device(s) (2250) may be a sound card or similar device that accepts audio input in analog or digital form, or a CD-ROM reader that provides audio samples to the computing environment. The output device(s) (2260) may be a display, printer, speaker, CD-writer, or another device that provides output from the computing environment (2200).

The communication connection(s) (2270) enable communication over a communication medium to another computing entity. The communication medium conveys information such as computer-executable instructions, compressed graphics information, or other data in a modulated data signal.

Computer-readable media are any available media that can be accessed within a computing environment. By way of example, and not limitation, with the computing environment (2200), computer-readable media include memory (2220), storage (2240), communication media, and combinations of any of the above.

Having described and illustrated the principles of our invention with reference to the illustrated embodiments, it will be recognized that the illustrated embodiments can be modified in arrangement and detail without departing from such principles. Elements of the illustrated embodiment shown in software may be implemented in hardware and vice versa. Also, the technologies from any example can be combined with the technologies described in any one or more of the other examples.

In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We therefore claim as our invention all subject matter that comes within the scope and spirit of these claims.

We claim:

1. A computer implemented method for generating a triangulated mesh representation of a complex graphical object formed at least in part by applying constructive solid geometry operations to a plurality of primitive graphical objects, the method comprising:

receiving data representing graphical models of the plurality of primitive graphical objects;

performing constructive solid geometry operations based on the plurality of primitive graphical objects to generate a domain based representation of the complex graphical object;

decomposing the domain based representation of the complex graphical object to generate coarse statically triangulated two-dimensional meshes representing the complex graphical object;

storing the coarse statically triangulated two-dimensional meshes; and at runtime, applying geometry instancing to the coarse triangulated two-dimensional meshes to generate refined runtime three-dimensional triangulated meshes for rendering the complex graphical object to a display device.

2. The method of claim 1, wherein the domain based representation of the complex graphical object comprises implicit curves of intersection defined at least in part by an implicit function based at least in part on the constructive solid geometry operations performed on the plurality of primitive graphical objects.

3. The method of claim 2, wherein generating the coarse statically triangulated two-dimensional meshes comprises:

determining a plurality of parameterization regions within the implicit curves of intersection;

adding constraining edges to the plurality of parameterization regions;

triangulating the domain based representation of the complex graphical object with the constraining edges to determine a Delaunay triangulation of the domain based representation of the complex graphical object; and further triangulating the Delaunay triangulation by adding vertices to generate curve visibility triangles having corresponding constraining edges as a base.

4. The method of claim 3, wherein the domain based representation of the complex graphical object comprises at least a plurality of implicit curves of intersection and the method further comprises:

determining whether the constraining edges corresponding to different ones of the plurality of implicit curves intersect with each other; and sub-dividing at least one of the parameterization regions corresponding to the intersecting constraining edges until the intersecting constraining edges no longer intersect each other.

5. The method of claim 3, wherein the curve visibility triangles comprise an apex such that a straight line segment from the apex to any point on corresponding one of the constraining edges intersects the corresponding one of the implicit curves no more than once.

6. The method of claim 3, wherein generating the curve visibility triangles comprises determining a range of tangents to the corresponding parameterization regions by calculating an implicit differentiation of the implicit function defining the corresponding one of the implicit curves over a range of values of independent variables associated with the corresponding parameterization regions.

7. The method of claim 6, wherein the range of tangents comprises a maximum tangent with maximum value slope and minimum tangent with a minimum value slope and the curve visibility triangles are generated by selecting an apex in a visibility region.

8. The method of claim 7, wherein the visibility region is determined by determining a region in the domain bounded by a first line segment extending from a first end point of the corresponding parameterization region, having the maximum slope and a second line segment extending from a second end point of the corresponding parameterization region having the minimum slope beyond a point in the domain where the first and the second line segments intersect each other.

9. The method of claim 8, wherein the points in the visibility region selected to be the apices of the curve visibility triangles are selected so as avoid interference between the curve visibility triangles.

10. The method of claim 1, further comprising, at runtime, further sub-dividing triangles of the coarse statically triangulated meshes into a runtime sub-divided meshes of sampling triangles.

11. The method of claim 10, further comprising determining classifications of the sampling triangles according to sampling triangle classification types, wherein the sampling triangle types are selected from a group consisting of a non-curve based simple sampling triangle, a non-curve based triangle generated by sub-dividing a curve visibility triangle and a curve based runtime curve visibility triangle.

12. The method of claim 11, wherein applying geometry instancing to the coarse triangulated mesh to generate the refined runtime triangulated mesh comprises:

selecting appropriate geometry instance meshes to be mapped to the sampling triangles based at least in part on their corresponding sampling triangle classification type; and mapping the appropriate geometry instance meshes to the sampling triangles based at least in part on barycentric coordinates of the geometry instance meshes.

13. A computer system for rendering a complex procedural surface formed at least in part based on constructive solid geometry operations performed using a plurality of primitive procedural surfaces, the system comprising:

a general purpose central processing unit programmed to be operable for:

pre-processing a domain based representation of the complex graphical object to generate coarse statically triangulated meshes representing the complex graphical object; and at runtime, refining the statically triangulated meshes by sub-dividing at least some of the triangles of the statically triangulated meshes to generate meshes of sampling triangles; and a graphics processing unit programmed to be operable for:

receiving vertex data related to the meshes of sampling triangles and data related to classification of the sampling triangles; and based at least in part on the classification of the sampling triangles, selecting appropriate geometry instancing meshes to be mapped within the sampling triangles to generate refined runtime triangulated meshes for rendering on a display.

14. The system of claim 13, wherein the complex graphical object comprises at least one implicit of curve of intersection generated at least in part by the constructive solid geometry operations performed using the plurality of primitive procedural objects and the general purpose central processing unit is further operable for determining parameterization regions of the implicit curves.

15. The system of claim 14, wherein refining the statically triangulated meshes to generate the meshes of sampling triangles comprises computing points on the implicit curves of intersection and adding further edges to sub-divide curve visibility triangles at least in part forming the statically triangulated meshes.

16. The system of claim 13, wherein the classification of the sampling triangles comprises a classification type selected from a group consisting of a non-curve based simple sampling triangle, a non-curve based triangle generated by sub-dividing a curve visibility triangle and a curve based runtime curve visibility triangle.

17. The system of claim 16, wherein selecting the appropriate geometry instancing meshes to be mapped within the sampling triangles to generate refined runtime triangulated meshes comprises selecting a NN1-type instance mesh to be mapped to sampling triangles with the classification type of curve based runtime curve visibility triangle.

18. The system of claim 16, wherein selecting the appropriate geometry instancing meshes to be mapped within the sampling triangles to generate refined runtime triangulated meshes comprises selecting a NNN-type instance mesh to be mapped to sampling triangles with the classification type of non-curve based simple sampling triangle.

19. The system of claim 16, wherein selecting the appropriate geometry instancing meshes to be mapped within the sampling triangles to generate refined runtime triangulated meshes comprises selecting a NN2N-type instance mesh to be mapped to sampling triangles with the classification type of non-curve based triangle generated by sub-dividing curve visibility triangle of the coarse statically triangulated meshes.

20. At least one computer-readable medium having stored thereon computer-executable instructions for performing a method of rendering complex procedural surfaces formed at least in part based on constructive solid geometry operations performed using a plurality of primitive procedural surfaces, the method comprising:

receive vertex data related to triangles of at least a portion of a statically triangulated representation of the complex procedural surfaces;

based at least in part on a classification of triangles of at least the portion of the statically triangulated representation of the complex procedural surfaces select appropriate geometry instancing meshes to be mapped into the triangles of at least the portion of the statically triangulated representation of the complex procedural surfaces; and mapping the appropriate geometry instancing meshes within the triangles of at least the portion of the statically triangulated representation of the complex procedural surfaces based at least in part on the barycentric coordinates of the appropriate geometry instancing meshes.

* * * * *

UNITED STATES PATENT AND TRADEMARK OFFICE
CERTIFICATE OF CORRECTION

PATENT NO. : 7,408,548 B2  
APPLICATION NO. : 11/172653  
DATED : August 5, 2008  
INVENTOR(S) : Brian K. Guenter et al.

Page 1 of 1

It is certified that error appears in the above-identified patent and that said Letters Patent is hereby corrected as shown below:

In column 16, line 54, in Claim 17, delete "NN 1-type" and insert -- NN1-type --, therefor.

Signed and Sealed this
Twenty-sixth Day of April, 2011

David J. Kappos
*Director of the United States Patent and Trademark Office*